(12) United States Patent
Rangan

(10) Patent No.: US 9,330,355 B2
(45) Date of Patent: May 3, 2016

(54) COMPUTED SYNAPSES FOR NEUROMORPHIC SYSTEMS

(71) Applicant: QUALCOMM Incorporated, San Diego, CA (US)

(72) Inventor: Venkat Rangan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 14/084,326

(22) Filed: Nov. 19, 2013

(65) Prior Publication Data

US 2015/0046382 A1 Feb. 12, 2015

Related U.S. Application Data

(60) Provisional application No. 61/862,741, filed on Aug. 6, 2013.

(51) Int. Cl.
*G06N 3/04* (2006.01)
*G06N 3/08* (2006.01)
*G06N 3/063* (2006.01)

(52) U.S. Cl.
CPC .......... *G06N 3/08* (2013.01); *G06N 3/049* (2013.01); *G06N 3/063* (2013.01); *G06N 3/082* (2013.01)

(58) Field of Classification Search
CPC ....................................................... G06N 3/08
See application file for complete search history.

(56) References Cited

U.S. PATENT DOCUMENTS

| 7,085,749 | B2 | 8/2006 | Matsugu |
| 7,430,546 | B1 | 9/2008 | Suri |
| 8,005,773 | B2 | 8/2011 | Ananthanarayanan et al. |
| 8,103,602 | B2 | 1/2012 | Izhikevich |
| 8,326,782 | B2 | 12/2012 | Snook et al. |
| 8,510,244 | B2 | 8/2013 | Carson et al. |
| 2010/0235310 | A1 | 9/2010 | Gage et al. |
| 2010/0312736 | A1 | 12/2010 | Kello |
| 2011/0137843 | A1 | 6/2011 | Poon et al. |

(Continued)

OTHER PUBLICATIONS

0'Brien M. J. et al., "The Role of Short-Term Synaptic Plasticity in Neural Network Spiking Dynamics and in the Learning of Multiple Distal Rewards", Thesis for Doctor of Philosophy in Mathematics at University of California, Apr. 1, 2013, XP055134156, ISBN: 978-1-30-300595-4 A Retrieved from the Internet: URL:http:jjsearch.proquest.comjdocview/1346230398 [retrieved on May 3, 2013] chapters 2 and 5.

(Continued)

*Primary Examiner* — Alan Chen
(74) *Attorney, Agent, or Firm* — Patterson & Sheridan, L.L.P.

(57) ABSTRACT

Methods and apparatus are provided for determining synapses in an artificial nervous system based on connectivity patterns. One example method generally includes determining, for an artificial neuron, an event has occurred; based on the event, determining one or more synapses with other artificial neurons based on a connectivity pattern associated with the artificial neuron; and applying a spike from the artificial neuron to the other artificial neurons based on the determined synapses. In this manner, the connectivity patterns (or parameters for determining such patterns) for particular neuron types, rather than the connectivity itself, may be stored. Using the stored information, synapses may be computed on the fly, thereby reducing memory consumption and increasing memory bandwidth. This also saves time during artificial nervous system updates.

40 Claims, 15 Drawing Sheets

(56) References Cited

U.S. PATENT DOCUMENTS

| | | | |
|---|---|---|---|
| 2011/0153533 | A1 | 6/2011 | Jackson et al. |
| 2012/0109863 | A1 | 5/2012 | Esser et al. |
| 2012/0173471 | A1 | 7/2012 | Ananthanarayanan et al. |
| 2012/0317063 | A1 | 12/2012 | Sim et al. |
| 2012/0330872 | A1 | 12/2012 | Esser et al. |
| 2013/0073491 | A1 | 3/2013 | Izhikevich et al. |
| 2013/0073497 | A1 | 3/2013 | Akopyan et al. |
| 2013/0073499 | A1 | 3/2013 | Izhikevich et al. |
| 2014/0052679 | A1 | 2/2014 | Sinyavskiy et al. |
| 2014/0122400 | A1 | 5/2014 | Szatmary et al. |
| 2014/0229411 | A1 | 8/2014 | Richert et al. |
| 2014/0244557 | A1 | 8/2014 | Piekniewski et al. |
| 2014/0351186 | A1 | 11/2014 | Julian et al. |
| 2014/0351190 | A1 | 11/2014 | Levin et al. |
| 2015/0046381 | A1 | 2/2015 | Malone et al. |

OTHER PUBLICATIONS

Cessac B., et al., "Introducing numerical bounds to improve event-based neural network simulation", arXiv: 0810.3992v2, Mar. 20, 2009, XP055102571, Retrieved from the Internet: URL:http://arxiv.org/abs/0810.3992v2 [retrieved on Feb. 14, 2014] Sections 1 and 2.
International Search Report and Written Opinion—PCT/US2014/037834—ISA/EPO—Aug. 22, 2014.
Jin X. et al., "Implementing Spike-Timing-Dependent Plasticity on SpiNNaker Neuromorphic Hardware", Proceedings of the 2010 International Joint Conference on Neural Networks (IJCNN '10), (Jul. 18, 2010), XP031771405, DOI: 10.1109/IJCNN.2010.5596372, sections III and v.
Morrison A., et al., "Phenomenological models of synaptic plasticity based on spike timing," Biological Cybernetics, vol. 98, No. 6, Apr. 9, 2008, pp. 459-478, XP019630139, DOI: 10.1007/S00422-008-0233-1 Section 4.1.3.
Morrison A. et al., "Spike-Timing-Dependent Plasticity in Balanced Random Networks", Neural Computation, vol. 19, No. 6, Apr. 19, 2007, pp. 1437-1467, XP055134149, DOI: 10.1162/neco.2007.19.6.1437, sections 2, 5 and appendix.
Mouraud A. et al., "DAMNED Un Simulateur Parallele Et Evenementiel Pour Reseaux De Neurones Impulsionnels", Actes de la 1ere conference francophone de Neurosciences Computationnelles (NeuroComp'06), Oct. 23, 2006, pp. 120-123, XP055134204, Retrieved from the Internet: URL:http:jjwayback.archive.orgjweb/20071012155858/http://www.neurocomp.fr/neurocomp-2006/actes.pdf#page=120 [retrieved on Oct. 12, 2007].
Ros E., et al., "Event-driven simulation scheme for spiking neural networks using lookup tables to characterize neuronal dynamics", Neural Computation, vol. 18, No. 12, Oct. 19, 2006, pp. 2959-2993, XP055103194, DOI: 10.1162/neco.2006.18.12.2959 sections 1, 2 and 8.
Vidybida A. K. "Computer Simulation of Inhibition-Dependent Binding in a Neural Network", Biosystems, vol. 71, No. 1-2, Aug. 26, 2003, pp. 205-212, XP004728165, DOI: 10.1016/S0303-2647(03)00126-6, section 2.
Adams S.V., et al., "Adaptive training of cortical feature maps for a robot sensorimotor controller", Neural Networks, vol. 44, Mar. 13, 2013, pp. 6-21, XP055171379, DOI: 10.1016/j.neunet.2013.03.004.
Bamford S.A., et al., "Large developing receptive fields using a distributed and locally reprogrammable address-event receiver", IEEE Transactions on Neural Networks, vol. 21. No. 2, Jan. 12, 2010, pp. 286-304. XP011287395, DOI: 10.1109/TNN.2009.2036912.
Hunzinger J.F., et al., "Learning complex temporal patterns with resource-dependent spike-timing-dependent plasticity", Journal of Neurophysiology (Articles in Press), Apr. 11, 2012, pp. 58, XP055100784, DOI: 10.1152/jn.01150.2011 Retrieved from the Internet: URL: http://jn.physiology.org/content/early/2012/04/06/jn.01150.2011.full.pdf [retrieved on Feb. 5, 2012] Resource model.
Iglesias J., et al., "Dynamics of pruning in simulated large-scale spiking neural networks", Biosystems, vol. 79, No. 1-3, Nov. 17, 2004, pp. 11-20, XP027606684, DOI: 10.1016/j.biosystems.2004.09.016.
International Search Report and Written Opinion—PCT/US2014/047858—ISA/EPO—Mar. 9, 2015.
Jun J.K., et al., "Development of neural circuitry for precise temporal sequences through spontaneous activity, axon remodeling, and synaptic plasticity", PLOS One, vol. 2, No. 8, E723, Aug. 8, 2007, XP055100781,pp. 1-24, DOI: 10.1371/journal.pone.0000723.
Mouraud A., et al., "DAMNED: a distributed and multithreaded neural event-driven simulation framework", arXiv:cs/0512018v1 [cs.NE], Dec. 5, 2005, XP055102577, Retrieved from the Internet: URL:http://arxiv.org/abs/cs/0512018v1 [retrieved on Feb. 14, 2014].
Pande S., et al., "Modular Neural Tile Architecture for Compact Embedded Hardware Spiking Neural Network", Neural Processing Letters, vol. 38. No. 2, Jan. 1, 2013, pp. 131-153, XP055170310, DOI: 10.1007/s11063-012-9274-5.
Vogelstein R.J., et al., "Dynamically reconfigurable silicon array of spiking neurons with conductance-based synapses", IEEE Transactions on Neural Networks, vol. 18, No. 1, Jan. 2007, pp. 253-265. XP011152920, DOI: 10.1109/TNN.2006.883007.
Wei Y., et al., "Long-term memory stabilized by noise-induced rehearsal", arXiv:1205.7085v1 [q-bio.NC], May 31, 2012, XP055171554,pp. 1-13, Retrieved from the Internet: URL:http://arxiv.org/abs/1205.7085v1 [retrieved on Feb. 19, 2015].
Weng J., et al., "Dually Optimal Neuronal Layers: Lobe Component Analysis", IEEE Transactions on Autonomous Mental Development, vol. 1, No. 1, May 29, 2009, pp. 68-85, XP011327965, DOI: 10.1109/TAMD.2009.2021698.
Bako L., et al., "Hardware Implementation of Delay-Coded Spiking-RBF Neural Network for Unsupervised Clustering," in 11th International Conference on Optimization of Electrical and Electronic Equipment (OPTIM), 2008, pp. 51-56.
Choudhary, et al., "Silicon Neurons that Compute", ICANN'12 Proceedings of the 22nd international conference on Artificial Neural Networks and Machine Learning. 2012, pp. 121-128.
Belhadj B., et al., "Configurable conduction delay circuits for high spiking rates", Proceedings of the 2012 IEEE International Symposium on Circuits and Systems (ISCAS'12), May 20, 2015, pp. 2091-2094, XP055182793, DOI: 10.1109/ISCAS.2012.6271696, section II.
Belhadj-Mohamed B., "Systemes Neuromorphiques Temps Reel: Contribution a l'integration De Reseaux De Neurones Biologiquement Realsites Avec Fonctions De Plasticite", These de Doctorat en Electronique de l'universite Bordeaux I, Jul. 12, 2007, XP055170324, Retrieved from the Internet: URL:http://ori-oai.u-bordeaux1.fr/pdf/2010/BELHADJ-MOHAMED_BILEL_2010.pdf [retrieved on Nov. 2, 2010].
Brette R., et al., "Simulation of networks of spiking neurons: a review of tools and strategies", Journal of Computational Neur0science, vol. 23, No. 3, Jul. 12, 2007, pp. 349-398, XP019552702, DOI: 10.1007/S10827-007-0038-6 the whole document.
Fidjeland A.K., et al., "NeMo: a platform for neural modelling of spiking neurons using GPUs", Proceedings of the 20th IEEE International Conference on Application-Specific Systems, Architectures and Processors (ASAP'09), Jul. 7, 2009, pp. 137-144, XP031506939, DOI: 10.1109/ASAP.2009.24, sections III and IV.
Stewart R D ., et al., "Spiking neural network simulation: memory-optimal synaptic event scheduling", Journal of Computational Neuroscience, vol. 30, No. 3, Nov. 3, 2010, pp. 721-728, XP019912205, DOI: 10.1007/S10827-010-0288-6 Sections 2 and 4.

COMPUTED SYNAPSES FOR NEUROMORPHIC SYSTEMS

CLAIM OF PRIORITY UNDER 35 U.S.C. §119

This application claims benefit of U.S. Provisional Patent Application Ser. No. 61/862,741, filed Aug. 6, 2013 and entitled "Computed Synapses for Neuromorphic Systems," which is herein incorporated by reference in its entirety.

BACKGROUND

1. Field

Certain aspects of the present disclosure generally relate to artificial nervous systems and, more particularly, to determining synapses based on artificial neuron connectivity patterns.

2. Background

An artificial neural network, which may comprise an interconnected group of artificial neurons (i.e., neuron models), is a computational device or represents a method to be performed by a computational device. Artificial neural networks may have corresponding structure and/or function in biological neural networks. However, artificial neural networks may provide innovative and useful computational techniques for certain applications in which traditional computational techniques are cumbersome, impractical, or inadequate. Because artificial neural networks can infer a function from observations, such networks are particularly useful in applications where the complexity of the task or data makes the design of the function by conventional techniques burdensome.

One type of artificial neural network is the spiking neural network, which incorporates the concept of time into its operating model, as well as neuronal and synaptic state, thereby providing a rich set of behaviors from which computational function can emerge in the neural network. Spiking neural networks are based on the concept that neurons fire or "spike" at a particular time or times based on the state of the neuron, and that the time is important to neuron function. When a neuron fires, it generates a spike that travels to other neurons, which, in turn, may adjust their states based on the time this spike is received. In other words, information may be encoded in the relative or absolute timing of spikes in the neural network.

SUMMARY

Certain aspects of the present disclosure generally relate to determining synapses for an artificial neuron in an artificial nervous system based on one or more connectivity patterns. The connectivity patterns need not be fixed and may change with time (e.g., due to modulation, aging, and/or dithering, for example). Once the synapses are determined, a spike output from the artificial neuron may be applied to other artificial neurons connected via the determined synapses.

Certain aspects of the present disclosure provide a method for neuromorphic processing. The method generally includes determining, for an artificial neuron, an event has occurred; based at least in part on the event, determining one or more synapses with other artificial neurons based at least in part on a connectivity pattern associated with the artificial neuron; and applying a spike from the artificial neuron to the other artificial neurons based at least in part on the determined synapses.

Certain aspects of the present disclosure provide an apparatus for neuromorphic processing. The apparatus generally includes a processing system and a memory coupled to the processing system. The processing system is typically configured to determine, for an artificial neuron, an event has occurred; to determine, based at least in part on the event, one or more synapses with other artificial neurons based at least in part on a connectivity pattern associated with the artificial neuron; and to apply a spike from the artificial neuron to the other artificial neurons based at least in part on the determined synapses.

Certain aspects of the present disclosure provide an apparatus for neuromorphic processing. The apparatus generally includes means for determining, for an artificial neuron, an event has occurred; means for determining, based at least in part on the event, one or more synapses with other artificial neurons based at least in part on a connectivity pattern associated with the artificial neuron; and means for applying a spike from the artificial neuron to the other artificial neurons based at least in part on the determined synapses.

Certain aspects of the present disclosure provide a computer program product for neuromorphic processing. The computer program product generally includes a computer-readable medium having instructions executable to determine, for an artificial neuron, an event has occurred; to determine, based at least in part on the event, one or more synapses with other artificial neurons based at least in part on a connectivity pattern associated with the artificial neuron; and to apply a spike from the artificial neuron to the other artificial neurons based at least in part on the determined synapses.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

An Example Neural System

Figure 1:
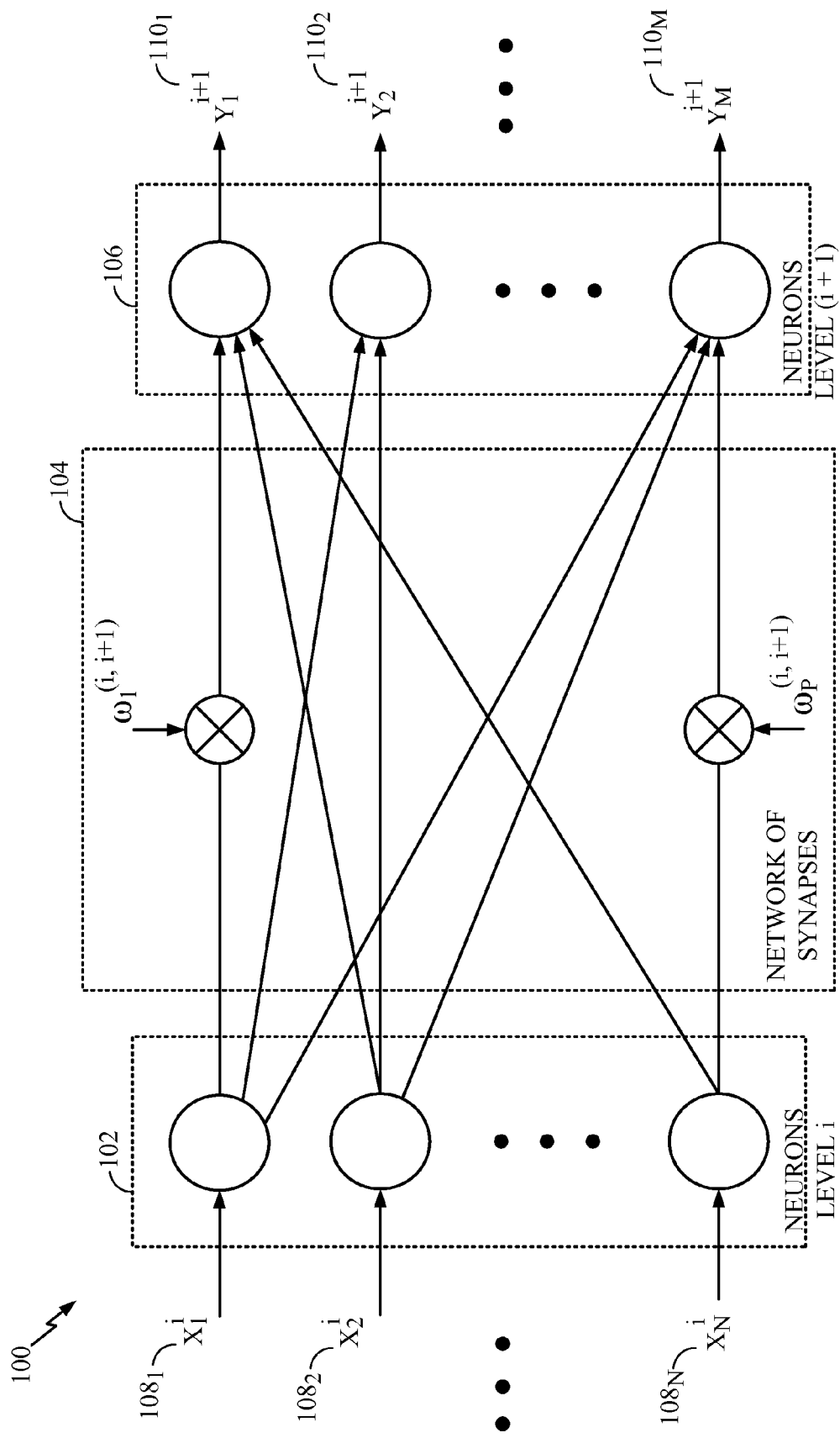
FIG. 1 illustrates an example network of neurons in accordance with certain aspects of the present disclosure.

FIG. 1 illustrates an example neural system 100 with multiple levels of neurons in accordance with certain aspects of the present disclosure. The neural system 100 may comprise a level of neurons 102 connected to another level of neurons 106 though a network of synaptic connections 104 (i.e., feed-forward connections). For simplicity, only two levels of neurons are illustrated in FIG. 1, although fewer or more levels of neurons may exist in a typical neural system. It should be noted that some of the neurons may connect to other neurons of the same layer through lateral connections. Furthermore, some of the neurons may connect back to a neuron of a previous layer through feedback connections.

As illustrated in FIG. 1, each neuron in the level 102 may receive an input signal 108 that may be generated by a plurality of neurons of a previous level (not shown in FIG. 1). The signal 108 may represent an input (e.g., an input current) to the level 102 neuron. Such inputs may be accumulated on the neuron membrane to charge a membrane potential. When the membrane potential reaches its threshold value, the neuron may fire and generate an output spike to be transferred to the next level of neurons (e.g., the level 106). Such behavior can be emulated or simulated in hardware and/or software, including analog and digital implementations.

In biological neurons, the output spike generated when a neuron fires is referred to as an action potential. This electrical signal is a relatively rapid, transient, all-or nothing nerve impulse, having an amplitude of roughly 100 mV and a duration of about 1 ms. In a particular aspect of a neural system having a series of connected neurons (e.g., the transfer of spikes from one level of neurons to another in FIG. 1), every action potential has basically the same amplitude and duration, and thus, the information in the signal is represented only by the frequency and number of spikes (or the time of spikes), not by the amplitude. The information carried by an action potential is determined by the spike, the neuron that spiked, and the time of the spike relative to one or more other spikes.

The transfer of spikes from one level of neurons to another may be achieved through the network of synaptic connections (or simply "synapses") 104, as illustrated in FIG. 1. The synapses 104 may receive output signals (i.e., spikes) from the level 102 neurons (pre-synaptic neurons relative to the synapses 104). For certain aspects, these signals may be scaled according to adjustable synaptic weights $w_1^{(i,i+1)}, \ldots, w_P^{(i,i+1)}$ (where P is a total number of synaptic connections between the neurons of levels 102 and 106). For other aspects, the synapses 104 may not apply any synaptic weights. Further, the (scaled) signals may be combined as an input signal of each neuron in the level 106 (post-synaptic neurons relative to the synapses 104). Every neuron in the level 106 may generate output spikes 110 based on the corresponding combined input signal. The output spikes 110 may be then transferred to another level of neurons using another network of synaptic connections (not shown in FIG. 1).

Biological synapses may be classified as either electrical or chemical. While electrical synapses are used primarily to send excitatory signals, chemical synapses can mediate either excitatory or inhibitory (hyperpolarizing) actions in postsynaptic neurons and can also serve to amplify neuronal signals. Excitatory signals typically depolarize the membrane potential (i.e., increase the membrane potential with respect to the resting potential). If enough excitatory signals are received within a certain period to depolarize the membrane potential above a threshold, an action potential occurs in the postsynaptic neuron. In contrast, inhibitory signals generally hyperpolarize (i.e., lower) the membrane potential Inhibitory signals, if strong enough, can counteract the sum of excitatory signals and prevent the membrane potential from reaching threshold. In addition to counteracting synaptic excitation, synaptic inhibition can exert powerful control over spontaneously active neurons. A spontaneously active neuron refers to a neuron that spikes without further input, for example, due to its dynamics or feedback. By suppressing the spontaneous generation of action potentials in these neurons, synaptic inhibition can shape the pattern of firing in a neuron, which is generally referred to as sculpturing. The various synapses 104 may act as any combination of excitatory or inhibitory synapses, depending on the behavior desired.

The neural system 100 may be emulated by a general purpose processor, a digital signal processor (DSP), an application specific integrated circuit (ASIC), a field programmable gate array (FPGA) or other programmable logic device (PLD), discrete gate or transistor logic, discrete hardware components, a software module executed by a processor, or any combination thereof. The neural system 100 may be utilized in a large range of applications, such as image and pattern recognition, machine learning, motor control, and the like. Each neuron (or neuron model) in the neural system 100 may be implemented as a neuron circuit. The neuron membrane charged to the threshold value initiating the output spike may be implemented, for example, as a capacitor that integrates an electrical current flowing through it.

In an aspect, the capacitor may be eliminated as the electrical current integrating device of the neuron circuit, and a smaller memristor element may be used in its place. This approach may be applied in neuron circuits, as well as in various other applications where bulky capacitors are utilized as electrical current integrators. In addition, each of the synapses 104 may be implemented based on a memristor element, wherein synaptic weight changes may relate to changes of the memristor resistance. With nanometer feature-sized memristors, the area of neuron circuit and synapses may be substantially reduced, which may make implementation of a very large-scale neural system hardware implementation practical.

Functionality of a neural processor that emulates the neural system 100 may depend on weights of synaptic connections, which may control strengths of connections between neurons. The synaptic weights may be stored in a non-volatile memory in order to preserve functionality of the processor after being powered down. In an aspect, the synaptic weight memory may be implemented on a separate external chip from the main neural processor chip. The synaptic weight memory may be packaged separately from the neural processor chip as a replaceable memory card. This may provide diverse functionalities to the neural processor, wherein a particular functionality may be based on synaptic weights stored in a memory card currently attached to the neural processor.

Figure 2:
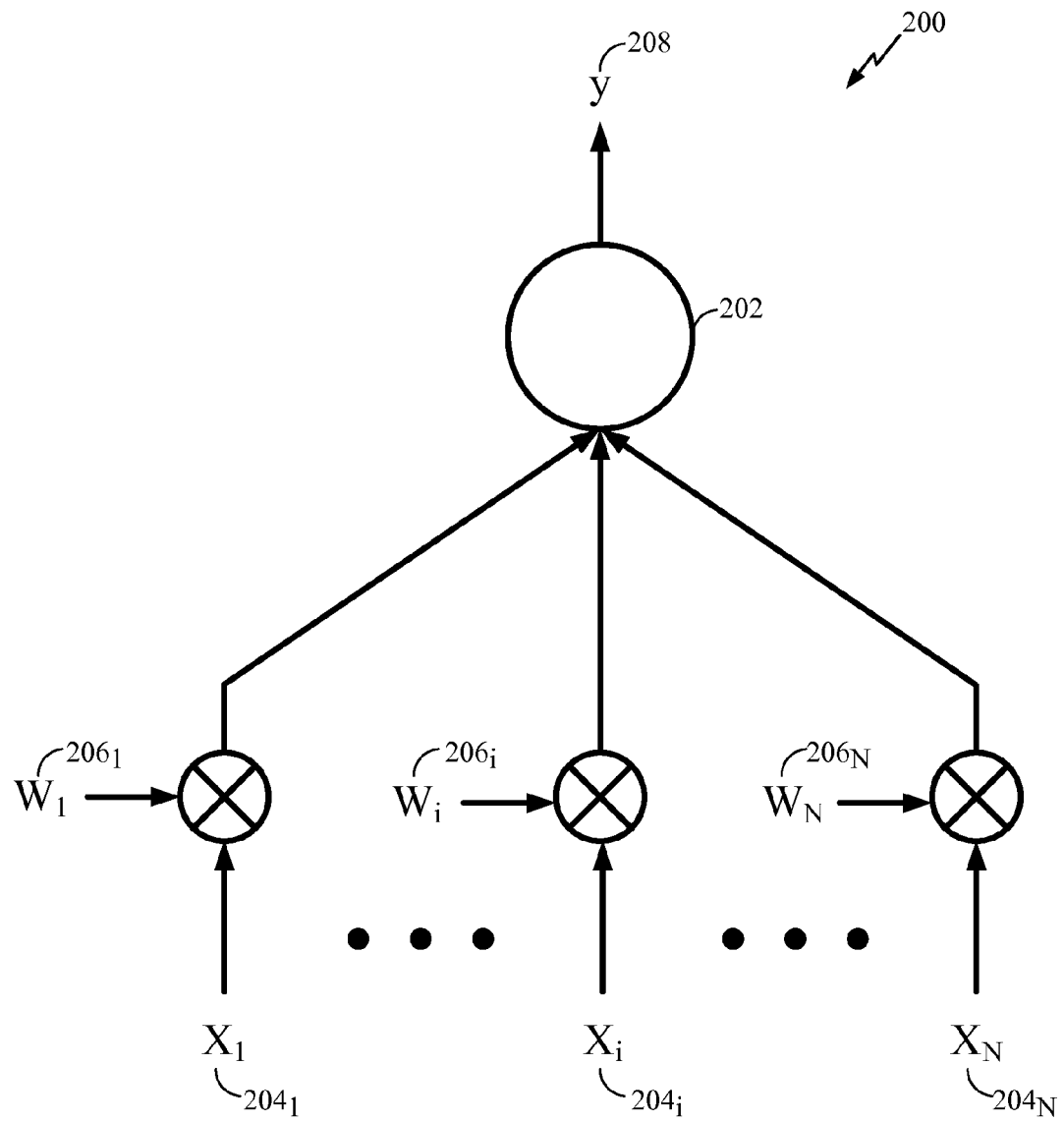
FIG. 2 illustrates an example processing unit (neuron) of a computational network (neural system or neural network), in accordance with certain aspects of the present disclosure.

FIG. 2 illustrates an example 200 of a processing unit (e.g., an artificial neuron 202) of a computational network (e.g., a neural system or a neural network) in accordance with certain aspects of the present disclosure. For example, the neuron 202 may correspond to any of the neurons of levels 102 and 106 from FIG. 1. The neuron 202 may receive multiple input signals $204_1$-$204_N$ ($x_1$-$x_N$), which may be signals external to the neural system, or signals generated by other neurons of the same neural system, or both. The input signal may be a current or a voltage, real-valued or complex-valued. The input signal may comprise a numerical value with a fixed-point or a floating-point representation. These input signals may be delivered to the neuron 202 through synaptic connections that scale the signals according to adjustable synaptic weights $206_1$-$206_N$ ($w_1$-$w_N$), where N may be a total number of input connections of the neuron 202.

The neuron 202 may combine the scaled input signals and use the combined scaled inputs to generate an output signal 208 (i.e., a signal y). The output signal 208 may be a current, or a voltage, real-valued or complex-valued. The output signal may comprise a numerical value with a fixed-point or a floating-point representation. The output signal 208 may be then transferred as an input signal to other neurons of the same neural system, or as an input signal to the same neuron 202, or as an output of the neural system.

The processing unit (neuron 202) may be emulated by an electrical circuit, and its input and output connections may be emulated by wires with synaptic circuits. The processing unit's input and output connections may also be emulated by a software code. The processing unit may also be emulated by an electric circuit, whereas its input and output connections may be emulated by a software code. In an aspect, the processing unit in the computational network may comprise an analog electrical circuit. In another aspect, the processing unit may comprise a digital electrical circuit. In yet another aspect, the processing unit may comprise a mixed-signal electrical circuit with both analog and digital components. The computational network may comprise processing units in any of the aforementioned forms. The computational network (neural system or neural network) using such processing units may be utilized in a large range of applications, such as image and pattern recognition, machine learning, motor control, and the like.

During the course of training a neural network, synaptic weights (e.g., the weights $w_1^{(i,i+1)}, \ldots, w_P^{(i,i+1)}$ from FIG. 1 and/or the weights $206_1$-$206_N$ from FIG. 2) may be initialized with random values and increased or decreased according to a learning rule. Some examples of the learning rule are the spike-timing-dependent plasticity (STDP) learning rule, the Hebb rule, the Oja rule, the Bienenstock-Copper-Munro (BCM) rule, etc. Very often, the weights may settle to one of two values (i.e., a bimodal distribution of weights). This effect can be utilized to reduce the number of bits per synaptic weight, increase the speed of reading and writing from/to a memory storing the synaptic weights, and to reduce power consumption of the synaptic memory.

Synapse Type

In hardware and software models of neural networks, processing of synapse related functions can be based on synaptic type. Synapse types may comprise non-plastic synapses (no changes of weight and delay), plastic synapses (weight may change), structural delay plastic synapses (weight and delay may change), fully plastic synapses (weight, delay and connectivity may change), and variations thereupon (e.g., delay may change, but no change in weight or connectivity). The advantage of this is that processing can be subdivided. For example, non-plastic synapses may not require plasticity functions to be executed (or waiting for such functions to complete). Similarly, delay and weight plasticity may be subdivided into operations that may operate in together or separately, in sequence or in parallel. Different types of synapses may have different lookup tables or formulas and parameters for each of the different plasticity types that apply. Thus, the methods would access the relevant tables for the synapse's type.

There are further implications of the fact that spike-timing dependent structural plasticity may be executed independently of synaptic plasticity. Structural plasticity may be executed even if there is no change to weight magnitude (e.g., if the weight has reached a minimum or maximum value, or it is not changed due to some other reason) since structural plasticity (i.e., an amount of delay change) may be a direct function of pre-post spike time difference. Alternatively, it may be set as a function of the weight change amount or based on conditions relating to bounds of the weights or weight changes. For example, a synaptic delay may change only when a weight change occurs or if weights reach zero, but not if the weights are maxed out. However, it can be advantageous to have independent functions so that these processes can be parallelized reducing the number and overlap of memory accesses.

Determination of Synaptic Plasticity

Neuroplasticity (or simply "plasticity") is the capacity of neurons and neural networks in the brain to change their synaptic connections and behavior in response to new information, sensory stimulation, development, damage, or dysfunction. Plasticity is important to learning and memory in biology, as well as to computational neuroscience and neural networks. Various forms of plasticity have been studied, such as synaptic plasticity (e.g., according to the Hebbian theory), spike-timing-dependent plasticity (STDP), non-synaptic plasticity, activity-dependent plasticity, structural plasticity, and homeostatic plasticity.

STDP is a learning process that adjusts the strength of synaptic connections between neurons, such as those in the brain. The connection strengths are adjusted based on the relative timing of a particular neuron's output and received input spikes (i.e., action potentials). Under the STDP process, long-term potentiation (LTP) may occur if an input spike to a certain neuron tends, on average, to occur immediately before that neuron's output spike. Then, that particular input is made somewhat stronger. In contrast, long-term depression (LTD) may occur if an input spike tends, on average, to occur immediately after an output spike. Then, that particular input is made somewhat weaker, hence the name "spike-timing-dependent plasticity." Consequently, inputs that might be the cause of the post-synaptic neuron's excitation are made even more likely to contribute in the future, whereas inputs that are not the cause of the post-synaptic spike are made less likely to contribute in the future. The process continues until a subset of the initial set of connections remains, while the influence of all others is reduced to zero or near zero.

Since a neuron generally produces an output spike when many of its inputs occur within a brief period (i.e., being sufficiently cumulative to cause the output), the subset of inputs that typically remains includes those that tended to be correlated in time. In addition, since the inputs that occur before the output spike are strengthened, the inputs that provide the earliest sufficiently cumulative indication of correlation will eventually become the final input to the neuron.

The STDP learning rule may effectively adapt a synaptic weight of a synapse connecting a pre-synaptic neuron to a post-synaptic neuron as a function of time difference between spike time $t_{pre}$ of the pre-synaptic neuron and spike time $t_{post}$ of the post-synaptic neuron (i.e., $t=t_{post}-t_{pre}$). A typical formulation of the STDP is to increase the synaptic weight (i.e., potentiate the synapse) if the time difference is positive (the pre-synaptic neuron fires before the post-synaptic neuron), and decrease the synaptic weight (i.e., depress the synapse) if the time difference is negative (the post-synaptic neuron fires before the pre-synaptic neuron).

In the STDP process, a change of the synaptic weight over time may be typically achieved using an exponential decay, as given by, $$\Delta w(t) = \begin{cases} a_+ e^{-t/k_+} + \mu, & t > 0 \\ a_- e^{t/k_-}, & t < 0 \end{cases} \quad (1)$$

where $k_+$ and $k_-$ are time constants for positive and negative time difference, respectively, $a_+$ and $a_-$ are corresponding scaling magnitudes, and $\mu$ is an offset that may be applied to the positive time difference and/or the negative time difference.

Figure 3:
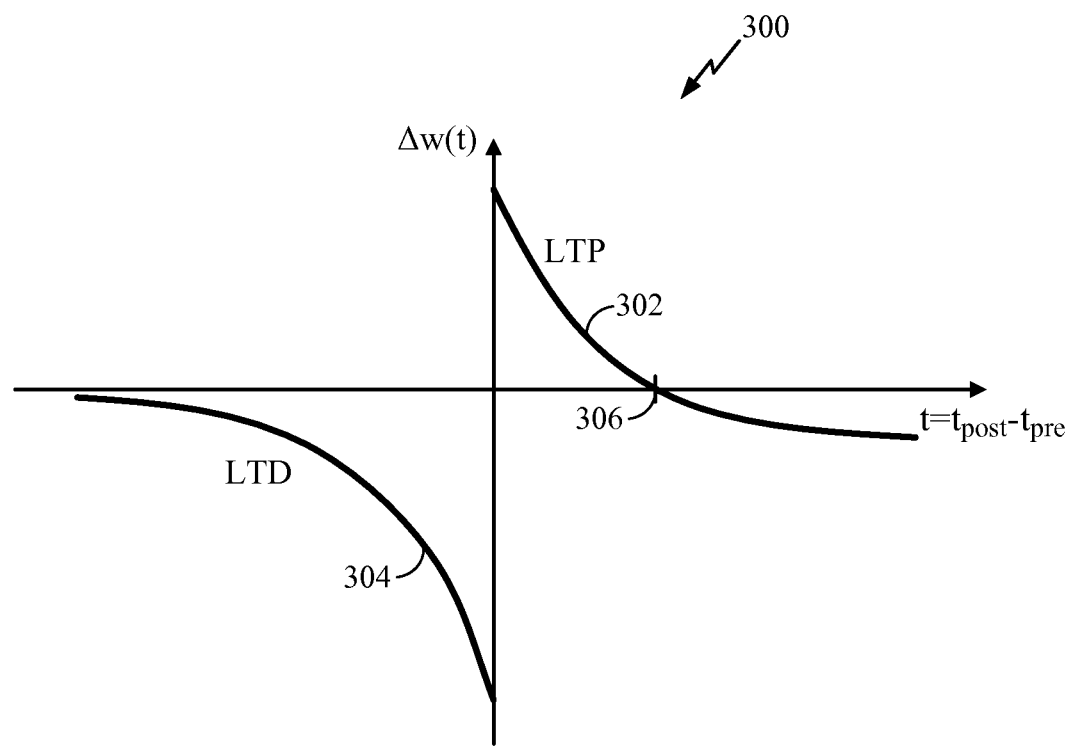
FIG. 3 illustrates an example spike-timing dependent plasticity (STDP) curve in accordance with certain aspects of the present disclosure.

FIG. 3 illustrates an example graph diagram 300 of a synaptic weight change as a function of relative timing of pre-synaptic and post-synaptic spikes in accordance with STDP. If a pre-synaptic neuron fires before a post-synaptic neuron, then a corresponding synaptic weight may be increased, as illustrated in a portion 302 of the graph 300. This weight increase can be referred to as an LTP of the synapse. It can be observed from the graph portion 302 that the amount of LTP may decrease roughly exponentially as a function of the difference between pre-synaptic and post-synaptic spike times. The reverse order of firing may reduce the synaptic weight, as illustrated in a portion 304 of the graph 300, causing an LTD of the synapse.

As illustrated in the graph 300 in FIG. 3, a negative offset $\mu$ may be applied to the LTP (causal) portion 302 of the STDP graph. A point of cross-over 306 of the x-axis (y=0) may be configured to coincide with the maximum time lag for considering correlation for causal inputs from layer i−1 (presynaptic layer). In the case of a frame-based input (i.e., an input is in the form of a frame of a particular duration comprising spikes or pulses), the offset value $\mu$ can be computed to reflect the frame boundary. A first input spike (pulse) in the frame may be considered to decay over time either as modeled by a post-synaptic potential directly or in terms of the effect on neural state. If a second input spike (pulse) in the frame is considered correlated or relevant of a particular time frame, then the relevant times before and after the frame may be separated at that time frame boundary and treated differently in plasticity terms by offsetting one or more parts of the STDP curve such that the value in the relevant times may be different (e.g., negative for greater than one frame and positive for less than one frame). For example, the negative offset $\mu$ may be set to offset LTP such that the curve actually goes below zero at a pre-post time greater than the frame time and it is thus part of LTD instead of LTP.

Neuron Models and Operation

There are some general principles for designing a useful spiking neuron model. A good neuron model may have rich potential behavior in terms of two computational regimes: coincidence detection and functional computation. Moreover, a good neuron model should have two elements to allow temporal coding: arrival time of inputs affects output time and coincidence detection can have a narrow time window. Finally, to be computationally attractive, a good neuron model may have a closed-form solution in continuous time and have stable behavior including near attractors and saddle points. In other words, a useful neuron model is one that is practical and that can be used to model rich, realistic and biologically-consistent behaviors, as well as be used to both engineer and reverse engineer neural circuits.

A neuron model may depend on events, such as an input arrival, output spike or other event whether internal or external. To achieve a rich behavioral repertoire, a state machine that can exhibit complex behaviors may be desired. If the occurrence of an event itself, separate from the input contribution (if any) can influence the state machine and constrain dynamics subsequent to the event, then the future state of the system is not only a function of a state and input, but rather a function of a state, event, and input.

In an aspect, a neuron n may be modeled as a spiking leaky-integrate-and-fire neuron with a membrane voltage $v_n(t)$ governed by the following dynamics, $$\frac{dv_n(t)}{dt} = \alpha v_n(t) + \beta \sum_m w_{m,n} y_m(t - \Delta t_{m,n}), \quad (2)$$

where $\alpha$ and $\beta$ are parameters, $w_{m,n}$ is a synaptic weight for the synapse connecting a pre-synaptic neuron m to a post-synaptic neuron n, and $y_m(t)$ is the spiking output of the neuron m that may be delayed by dendritic or axonal delay according to $\Delta t_{m,n}$ until arrival at the neuron n's soma.

It should be noted that there is a delay from the time when sufficient input to a post-synaptic neuron is established until the time when the post-synaptic neuron actually fires. In a dynamic spiking neuron model, such as Izhikevich's simple model, a time delay may be incurred if there is a difference between a depolarization threshold $v_t$ and a peak spike voltage $v_{peak}$. For example, in the simple model, neuron soma dynamics can be governed by the pair of differential equations for voltage and recovery, i.e., $$\frac{dv}{dt} = (k(v-v_t)(v-v_r) - u + I)/C, \quad (3)$$

$$\frac{du}{dt} = a(b(v-v_r) - u). \quad (4)$$

where v is a membrane potential, u is a membrane recovery variable, k is a parameter that describes time scale of the membrane potential v, a is a parameter that describes time scale of the recovery variable u, b is a parameter that describes sensitivity of the recovery variable u to the sub-threshold fluctuations of the membrane potential v, $v_r$ is a membrane resting potential, I is a synaptic current, and C is a membrane's capacitance. In accordance with this model, the neuron is defined to spike when $v > v_{peak}$.

Hunzinger Cold Model

The Hunzinger Cold neuron model is a minimal dual-regime spiking linear dynamical model that can reproduce a rich variety of neural behaviors. The model's one- or two-dimensional linear dynamics can have two regimes, wherein the time constant (and coupling) can depend on the regime. In the sub-threshold regime, the time constant, negative by convention, represents leaky channel dynamics generally acting to return a cell to rest in biologically-consistent linear fashion. The time constant in the supra-threshold regime, positive by convention, reflects anti-leaky channel dynamics generally driving a cell to spike while incurring latency in spike-generation.

Figure 4:
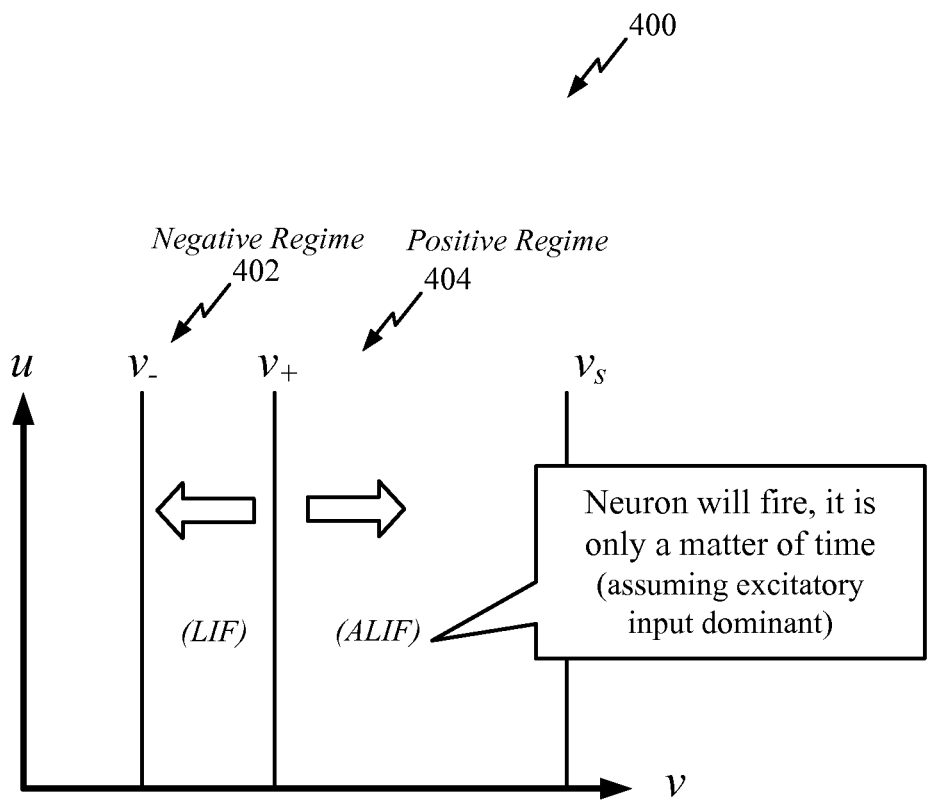
FIG. 4 is an example graph of state for an artificial neuron, illustrating a positive regime and a negative regime for defining behavior of the neuron, in accordance with certain aspects of the present disclosure.

As illustrated in FIG. 4, the dynamics of the model may be divided into two (or more) regimes. These regimes may be called the negative regime 402 (also interchangeably referred to as the leaky-integrate-and-fire (LIF) regime, not to be confused with the LIF neuron model) and the positive regime 404 (also interchangeably referred to as the anti-leaky-integrate-and-fire (ALIF) regime, not to be confused with the ALIF neuron model). In the negative regime 402, the state tends toward rest ($v_-$) at the time of a future event. In this negative regime, the model generally exhibits temporal input detection properties and other sub-threshold behavior. In the positive regime 404, the state tends toward a spiking event ($v_s$). In this positive regime, the model exhibits computational properties, such as incurring a latency to spike depending on subsequent input events. Formulation of dynamics in terms of events and separation of the dynamics into these two regimes are fundamental characteristics of the model.

Linear dual-regime bi-dimensional dynamics (for states v and u) may be defined by convention as, $$\tau_\rho \frac{dv}{dt} = v + q_\rho \quad (5)$$

$$-\tau_u \frac{du}{dt} = u + r \quad (6)$$

where $q_\rho$ and r are the linear transformation variables for coupling.

The symbol $\rho$ is used herein to denote the dynamics regime with the convention to replace the symbol $\rho$ with the sign "−" or "+" for the negative and positive regimes, respectively, when discussing or expressing a relation for a specific regime.

The model state is defined by a membrane potential (voltage) v and recovery current u. In basic form, the regime is essentially determined by the model state. There are subtle, but important aspects of the precise and general definition, but for the moment, consider the model to be in the positive regime 404 if the voltage v is above a threshold ($v_+$) and otherwise in the negative regime 402.

The regime-dependent time constants include $\tau_-$ which is the negative regime time constant, and $\tau_+$ which is the positive regime time constant. The recovery current time constant $\tau_u$ is typically independent of regime. For convenience, the negative regime time constant $\tau_-$ is typically specified as a negative quantity to reflect decay so that the same expression for voltage evolution may be used as for the positive regime in which the exponent and $\tau_+$ will generally be positive, as will be $\tau_u$.

The dynamics of the two state elements may be coupled at events by transformations offsetting the states from their null-clines, where the transformation variables are $$q_\rho = -\tau_\rho \beta u - v_\rho \quad (7)$$

$$r = \delta(v + \epsilon) \quad (8)$$

where $\delta$, $\epsilon$, $\beta$ and $v_-$, $v_+$ are parameters. The two values for $v_\rho$ are the base for reference voltages for the two regimes. The parameter $v_-$ is the base voltage for the negative regime, and the membrane potential will generally decay toward $v_-$ in the negative regime. The parameter $v_+$ is the base voltage for the positive regime, and the membrane potential will generally tend away from $v_+$ in the positive regime.

The null-clines for v and u are given by the negative of the transformation variables $q_\rho$ and r, respectively. The parameter $\delta$ is a scale factor controlling the slope of the u null-cline. The parameter $\epsilon$ is typically set equal to $-v_-$. The parameter $\beta$ is a resistance value controlling the slope of the v null-clines in both regimes. The $\tau_\rho$ time-constant parameters control not only the exponential decays, but also the null-cline slopes in each regime separately.

The model is defined to spike when the voltage v reaches a value $v_s$. Subsequently, the state is typically reset at a reset event (which technically may be one and the same as the spike event):

$$v = \hat{v}_- \quad (9)$$

$$u = u + \Delta u \quad (10)$$

where $\hat{v}_-$ and $\Delta u$ are parameters. The reset voltage $\hat{v}_-$ is typically set to $v_-$.

By a principle of momentary coupling, a closed form solution is possible not only for state (and with a single exponential term), but also for the time required to reach a particular state. The close form state solutions are $$v(t + \Delta t) = (v(t) + q_\rho)e^{\frac{\Delta t}{\tau_\rho}} - q_\rho \qquad (11)$$

$$u(t + \Delta t) = (u(t) + r)e^{-\frac{\Delta t}{\tau_u}} - r \qquad (12)$$

Therefore, the model state may be updated only upon events such as upon an input (pre-synaptic spike) or output (post-synaptic spike). Operations may also be performed at any particular time (whether or not there is input or output).

Moreover, by the momentary coupling principle, the time of a post-synaptic spike may be anticipated so the time to reach a particular state may be determined in advance without iterative techniques or Numerical Methods (e.g., the Euler numerical method). Given a prior voltage state $v_0$, the time delay until voltage state $v_f$ is reached is given by $$\Delta t = \tau_\rho \log \frac{v_f + q_\rho}{v_0 + q_\rho} \qquad (13)$$

If a spike is defined as occurring at the time the voltage state v reaches $v_s$, then the closed-form solution for the amount of time, or relative delay, until a spike occurs as measured from the time that the voltage is at a given state v is $$\Delta t_S = \begin{cases} \tau_+ \log \frac{v_S + q_+}{v + q_+} & \text{if } v > \hat{v}_+ \\ \infty & \text{otherwise} \end{cases} \qquad (14)$$

where $\hat{v}_+$ is typically set to parameter $v_+$, although other variations may be possible.

The above definitions of the model dynamics depend on whether the model is in the positive or negative regime. As mentioned, the coupling and the regime ρ may be computed upon events. For purposes of state propagation, the regime and coupling (transformation) variables may be defined based on the state at the time of the last (prior) event. For purposes of subsequently anticipating spike output time, the regime and coupling variable may be defined based on the state at the time of the next (current) event.

There are several possible implementations of the Cold model, and executing the simulation, emulation or model in time. This includes, for example, event-update, step-event update, and step-update modes. An event update is an update where states are updated based on events or "event update" (at particular moments). A step update is an update when the model is updated at intervals (e.g., 1 ms). This does not necessarily require iterative methods or Numerical methods. An event-based implementation is also possible at a limited time resolution in a step-based simulator by only updating the model if an event occurs at or between steps or by "step-event" update.

Neural Coding

A useful neural network model, such as one comprised of the artificial neurons 102, 106 of FIG. 1, may encode information via any of various suitable neural coding schemes, such as coincidence coding, temporal coding or rate coding. In coincidence coding, information is encoded in the coincidence (or temporal proximity) of action potentials (spiking activity) of a neuron population. In temporal coding, a neuron encodes information through the precise timing of action potentials (i.e., spikes) whether in absolute time or relative time. Information may thus be encoded in the relative timing of spikes among a population of neurons. In contrast, rate coding involves coding the neural information in the firing rate or population firing rate.

If a neuron model can perform temporal coding, then it can also perform rate coding (since rate is just a function of timing or inter-spike intervals). To provide for temporal coding, a good neuron model should have two elements: (1) arrival time of inputs affects output time; and (2) coincidence detection can have a narrow time window. Connection delays provide one means to expand coincidence detection to temporal pattern decoding because by appropriately delaying elements of a temporal pattern, the elements may be brought into timing coincidence.

Arrival Time

In a good neuron model, the time of arrival of an input should have an effect on the time of output. A synaptic input—whether a Dirac delta function or a shaped post-synaptic potential (PSP), whether excitatory (EPSP) or inhibitory (IPSP)—has a time of arrival (e.g., the time of the delta function or the start or peak of a step or other input function), which may be referred to as the input time. A neuron output (i.e., a spike) has a time of occurrence (wherever it is measured, e.g., at the soma, at a point along the axon, or at an end of the axon), which may be referred to as the output time. That output time may be the time of the peak of the spike, the start of the spike, or any other time in relation to the output waveform. The overarching principle is that the output time depends on the input time.

One might at first glance think that all neuron models conform to this principle, but this is generally not true. For example, rate-based models do not have this feature. Many spiking models also do not generally conform. A leaky-integrate-and-fire (LIF) model does not fire any faster if there are extra inputs (beyond threshold). Moreover, models that might conform if modeled at very high timing resolution often will not conform when timing resolution is limited, such as to 1 ms steps.

Inputs

An input to a neuron model may include Dirac delta functions, such as inputs as currents, or conductance-based inputs. In the latter case, the contribution to a neuron state may be continuous or state-dependent.

Example Synapse Computation

In an artificial nervous system, synapses between artificial neurons (e.g., synaptic connections 104) are usually stored in memory (e.g., random access memory (RAM)) and typically consume a large amount of space. Connectivity tables (e.g., listing the connections for each artificial neuron) are also stored in memory and may be stored along with the synapses. Memory bandwidth is limited due to the above two factors. In conventional schemes, dynamic changes to connectivity (e.g., due to neurogenesis or neuron death) entail a limited and slow process involving top-down processing.

One solution to limited memory is to compress synapse information. However, compression does not take advantage of the connectivity structure, so this solution may be considered sub-optimal.

Alternatively and in accordance with certain aspects of the present disclosure, connectivity patterns may be used to determine synapses in an artificial nervous system. As used herein, a connectivity pattern generally refers to a shape or other configuration characterizing an arrangement of synaptic connections between a particular pre-synaptic artificial neuron and one or more post-synaptic artificial neurons. For example, the connectivity patterns may be used to compute the (x,y,z) locations, particular delays and/or weights, and other parameters that are fixed or change relatively slowly. "Plastic" parameters that change more frequently, such as certain delays and weights, may be stored in RAM.

These fixed versus plastic parameters may be set somewhat arbitrarily by an artificial nervous system architect. For example, the architect may desire the artificial nervous system to learn within certain constraints. Based on the system topology, the architect may set a subset of the weights to be plastic while leaving the other weights fixed to constrain the learning algorithm.

According to certain aspects, the connectivity pattern or parameters (e.g., function or shape parameters) used to determine the connectivity pattern may be stored in memory (e.g., memory associated with each artificial neuron). For certain aspects, random or pseudo-random numbers with known seeds may be used to add some degree of randomness. Memory associated with an artificial neuron may store age and/or other parameters that can affect "computed" fanout connectivity directly, computed based on the connectivity pattern. A "growth cone" template for growth of an artificial neuron or of a class of neurons may also be stored in memory (e.g., memory for each artificial neuron or memory for at least a portion of the artificial nervous system). Neural fanout can change dynamically depending on various factors (e.g., growth and death, neuromodulation, etc.).

Connectivity pattern templates may be one-, two-, or three-dimensional. Two- or three-dimensional based interpolation (e.g., spline interpolation), capable of approximating smooth functions, may be implemented. Interpolation functions may be stored in RAM and may be scaled depending on the pre-synaptic artificial neuron. Neuromodulation (e.g., based on neuron type) may affect the range of synapses that are affected. The computed range of synapses may depend on neuron parameters (e.g., age) to cause new synapses to grow along particular paths, as governed by the interpolation function, for example. This leads to very fast updates for a whole class of neurons.

Figure 5:
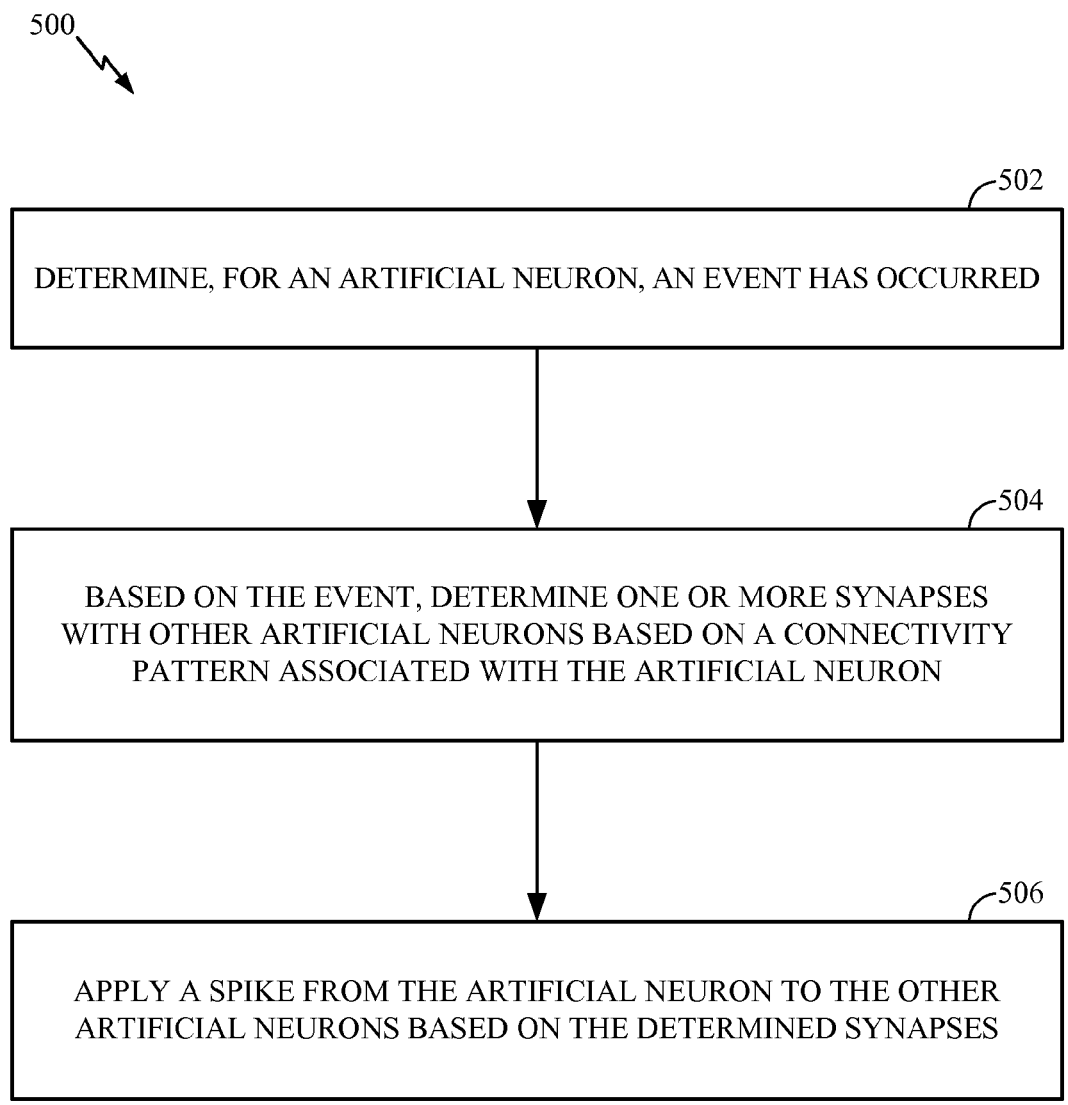
FIG. 5 is a flow diagram of example operations for operating an artificial nervous system using an artificial neuron connectivity pattern, in accordance with certain aspects of the present disclosure.

FIG. 5 is a flow diagram of example operations 500 for operating an artificial nervous system using an artificial neuron connectivity pattern, in accordance with certain aspects of the present disclosure. The operations 500 may be performed in hardware (e.g., by one or more neural processing units, such as a neuromorphic processor), in software, in firmware, or by any combination thereof.

The operations 500 may begin, at 502, by determining, for an artificial neuron, an event has occurred. As used herein, an event generally refers to any suitable trigger associated with the artificial neuron. For certain aspects, the event may include activation of the artificial neuron (e.g., outputting a spike). For other aspects, the event may be a prediction of activating the artificial neuron (e.g., a prediction of a spike that will occur).

Based on the event, one or more synapses with other artificial neurons may be determined at 504. This determination may be based on a connectivity pattern associated with the artificial neuron. For certain aspects, at least one of the connectivity pattern or parameters for defining the connectivity pattern are stored in memory. Note that the synapses are determined based on an event and for a particular neuron. The connectivity pattern may be based on any desired function or geometric shape, such as a circle, semicircle, ellipse, oval, rectangle or other polygon, parabola, sinusoid, etc. This function may be continuous or piecewise and may be one-, two-, or three-dimensional. Elementary shapes or functions may be combined to create more complex connectivity patterns.

At 506, a spike from the artificial neuron may be applied to the other artificial neurons based on the determined synapses. In other words, an action potential from the pre-synaptic artificial neuron may travel via the synapse(s) to the input of one or more post-synaptic artificial neurons determined to be connected to the output of the pre-synaptic neuron.

According to certain aspects, the operations 500 may further involve applying at least one dynamic variable to the spike from the artificial neuron for each of the synapses. For example, the dynamic variable may include at least one of a delay or a weight. For certain aspects, the dynamic variable may be stored in a random access memory (RAM). In this case, the dynamic variable may be accessed from the RAM before application.

According to certain aspects, determining the synapses at 504 includes applying a modulation factor to the connectivity pattern. Applying the modulation factor may change at least one of a shape or an extent (e.g., the reach or scope) of the connectivity pattern. For certain aspects, the modulation factor represents an aging factor associated with the artificial neuron. The modulation factor may be decaying (e.g., exponentially decaying) for certain aspects.

According to certain aspects, determining the synapses at 504 includes using interpolation to determine which of the other artificial neurons have synapses with the artificial neuron according to the connectivity pattern. Any suitable interpolation algorithm may be used, such as spline interpolation.

According to certain aspects, determining the synapses at 504 includes applying jitter to the connectivity pattern (e.g., using dithering). In this manner, which of the other artificial neurons have synapses with the artificial neuron may change slightly every time the synapses are determined, even when all other factors remain the same. This adds a certain degree of randomness to the artificial nervous system when synapses are computed on the fly according to the connectivity pattern.

According to certain aspects, the operations 500 may further include using feedback to regulate a number of the synapses associated with the artificial neuron.

In this manner, connectivity patterns (or parameters for determining such patterns) for particular neuron types, rather than the connectivity, may be stored. For certain aspects, only the plastic parameters are stored in RAM. Using the stored information, synapses may be computed on the fly, thereby reducing memory consumption and increasing memory bandwidth. This also saves time during artificial nervous system updates.

Figure 6A:
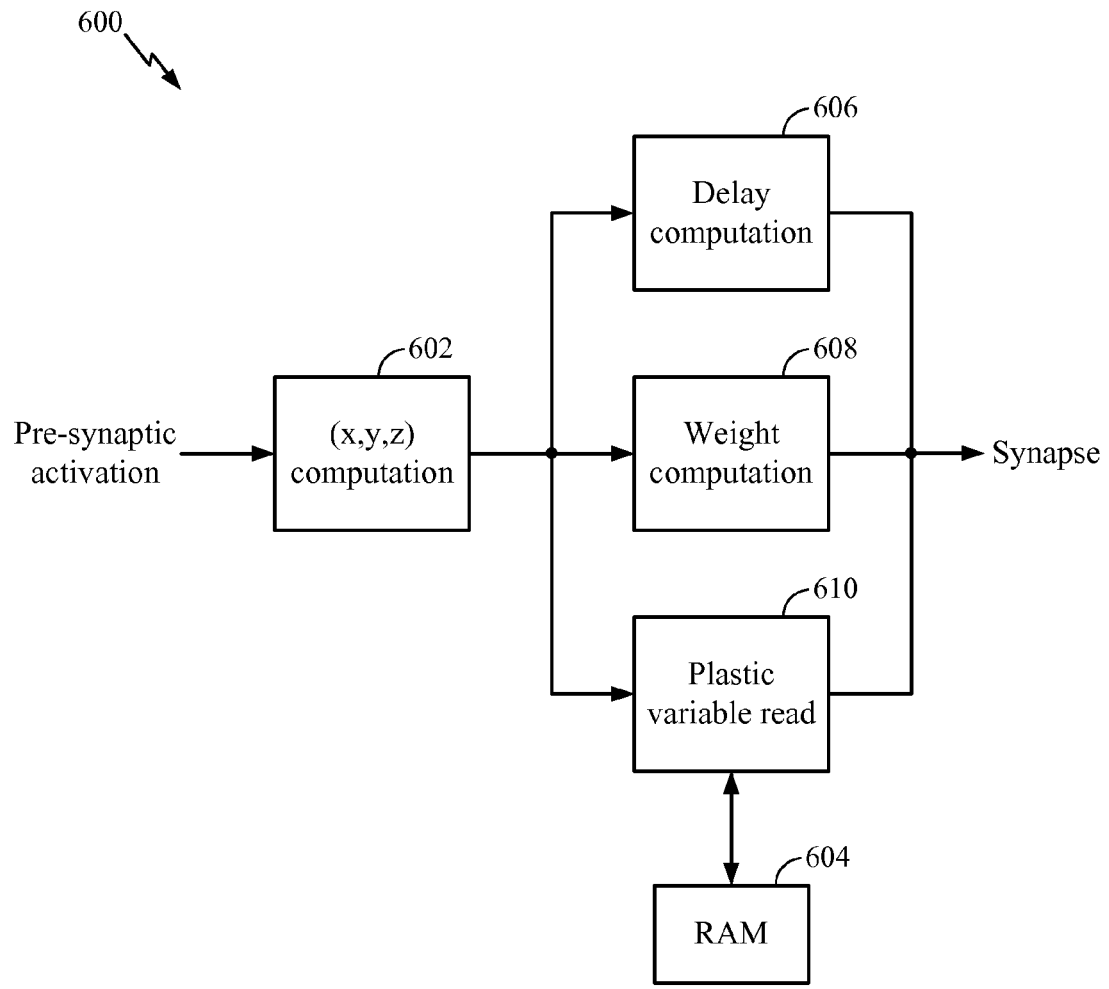
FIGS. 6A and 6B are block diagrams illustrating example implementations of determining synapses based on a connectivity pattern, in accordance with certain aspects of the present disclosure.

FIG. 6A is a block diagram 600 illustrating an example implementation of determining synapses based on a connectivity pattern, in accordance with certain aspects of the present disclosure. Once triggered, the connectivity computation module 602 for a particular artificial neuron may determine the connectivity pattern (e.g., based on parameters stored in memory associated with the artificial neuron) and then determine all the artificial neurons in the system located within the connectivity pattern. For certain aspects, the trigger for determining the all the other artificial neurons within the connectivity pattern may be activation of the artificial neuron (e.g., depolarization above a threshold or an action potential). These other artificial neurons are connected with the particular artificial neuron via synaptic connections. This determination of the synaptic connections may be based on any suitable coordinate system, such as rectangular coordinates (x, y, z) or polar coordinates (r, θ), and may utilize interpolation as described above. For certain aspects, the connectivity computation module 602 may apply dithering when determining the synaptic connections, as described above.

After the connectivity pattern has been applied by the connectivity computation module 602 to determine the synaptic connections, the synapses may then be computed by applying certain parameters to the synaptic connections. For example, a delay computation module 606 may apply fixed delays associated with the various synaptic connections, if any. A weight computation module 608 may apply fixed weights associated with the various synaptic connections, if any. The plastic variable module 610 may read various plastic variables (e.g., delays and weights), if any, stored in memory (such as RAM 604) and may apply these more dynamic variables to the various synaptic connections. This process may be repeated each time the pre-synaptic artificial neuron is triggered.

Figure 6B:
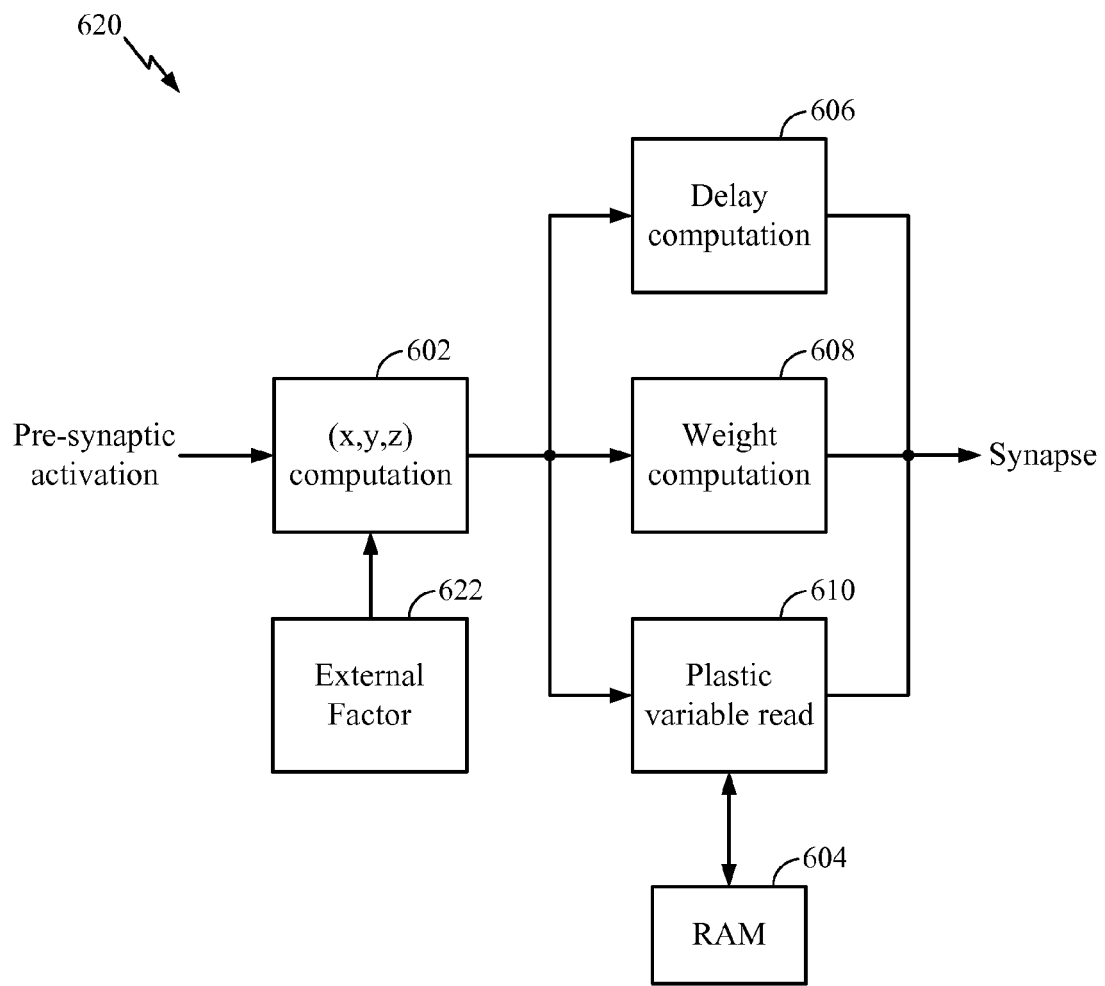

FIG. 6B is a block diagram 620 illustrating another example implementation of determining synapses based on a connectivity pattern, in accordance with certain aspects of the present disclosure. In FIG. 6B, the connectivity computation module 602 receives one or more external factors 622 that may be used when determining the synaptic connections. The external factors 622 may include neuromodulation factors, aging factors (e.g., for growth or death), decay factors, etc. The external factors 622 may change the extent and/or the shape of the connectivity pattern when the connectivity computation module 602 determines all the artificial neurons located within the connectivity pattern.

According to certain aspects, the external factors 622 may include the activity level of the pre-synaptic artificial neuron. For example, the connectivity may decrease with an increased activity level of the pre-synaptic artificial neuron. This may result in negative feedback, thereby regulating overall activity of the network and achieving homeostasis.

Figure 7A:
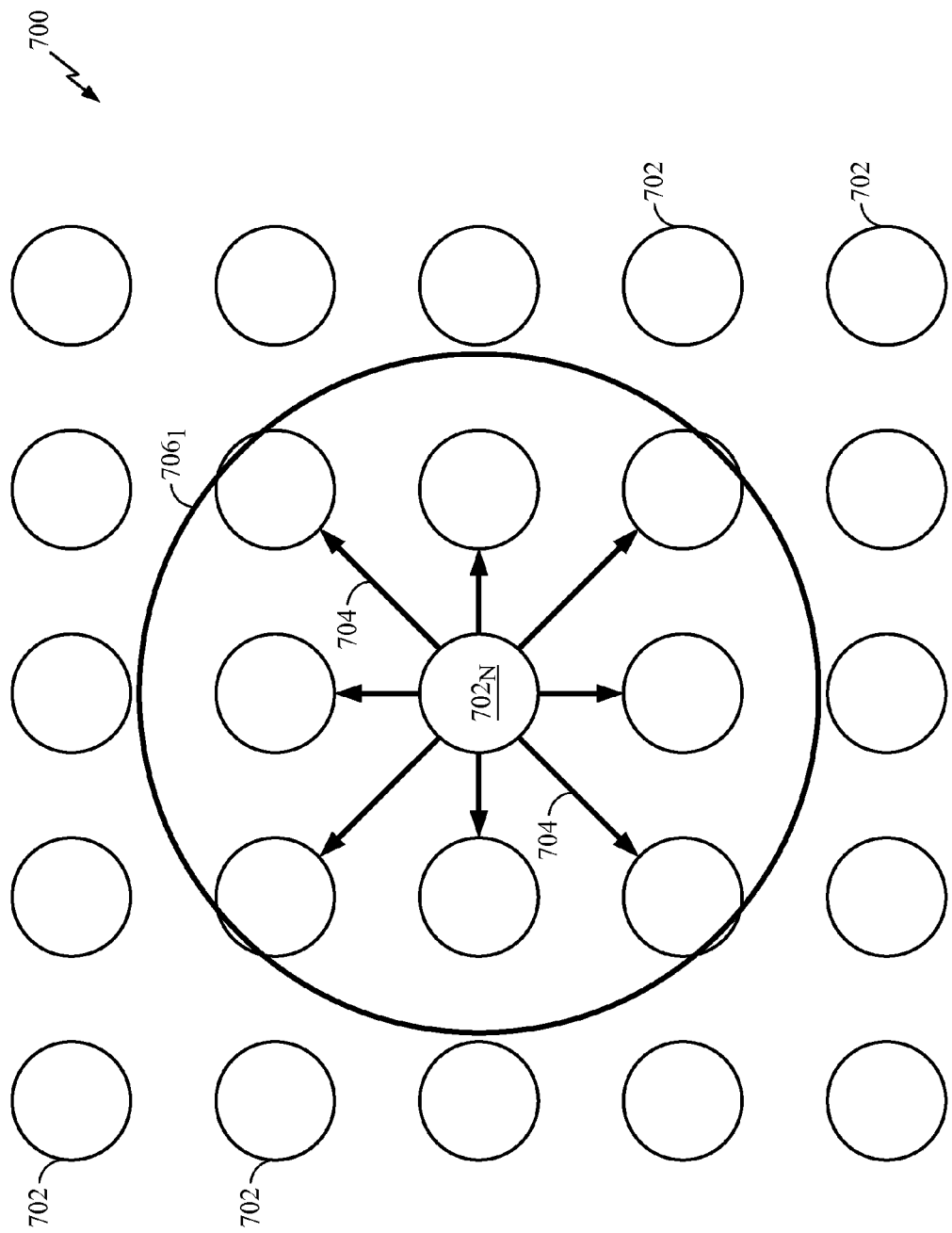
FIGS. 7A and 7B illustrate modulation of a connectivity pattern for an artificial neuron, in accordance with certain aspects of the present disclosure.

FIG. 7A illustrates a grid 700 of artificial neurons 702, in accordance with certain aspects of the present disclosure. Although a grid is depicted in FIG. 7A for illustrative purposes, artificial neurons associated with certain aspects of the present disclosure may be spaced within one-, two-, or three-dimensional space in any desired manner and need not be spaced uniformly or on a grid. As described above with respect to FIG. 5, after determination of an event for a particular artificial neuron $702_N$, one or more synapses 704 with other artificial neurons 702 may be determined based on a connectivity pattern $706_1$ associated with artificial neuron $702_N$. As portrayed in the example of FIG. 7A, the connectivity pattern $706_1$ for artificial neuron $702_N$ is a circular connectivity pattern. The particular artificial neuron $702_N$ is determined to have synapses with all the artificial neurons 702 having a location on the grid 700 within the circular connectivity pattern $706_1$.

Figure 7B:
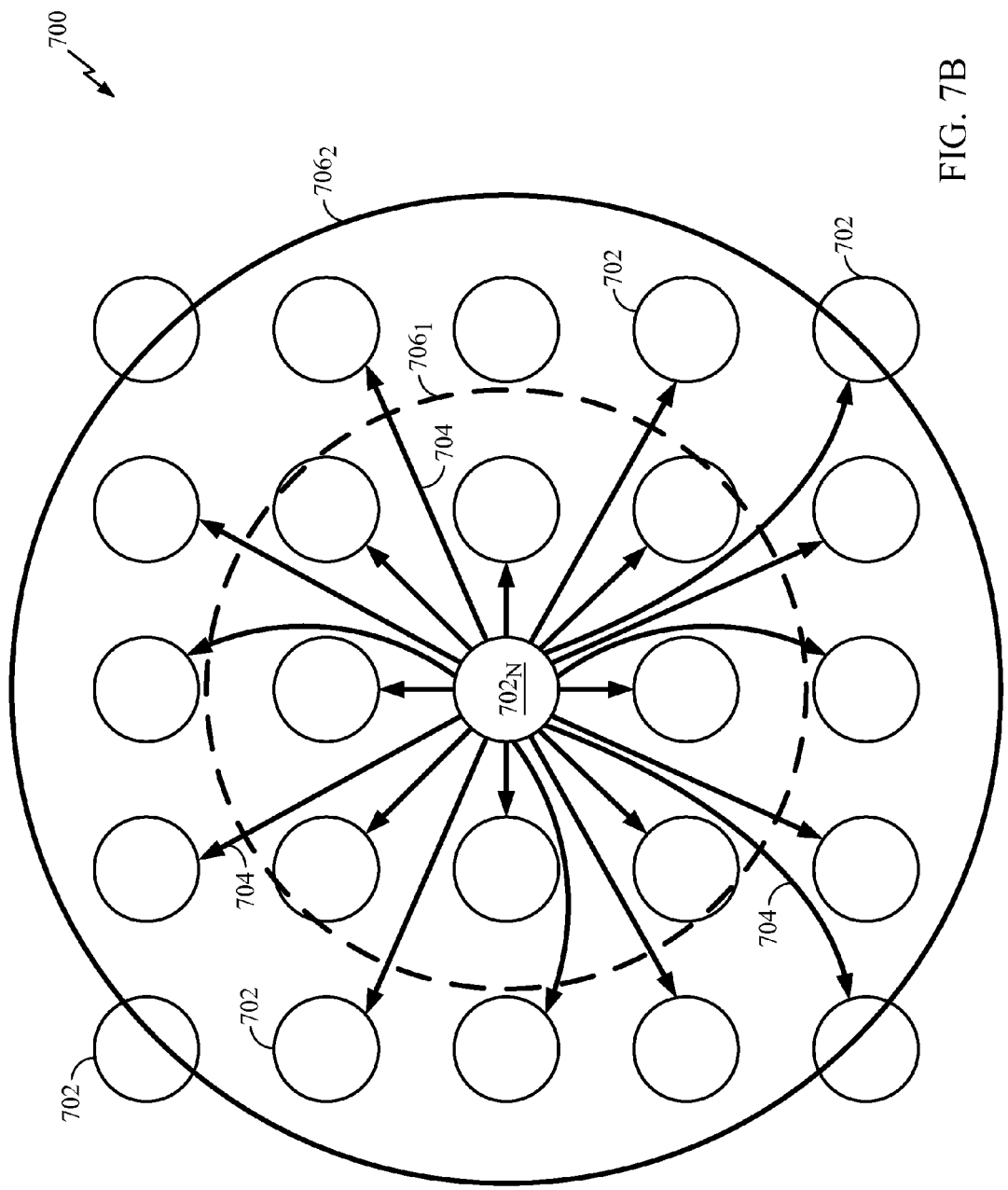

In FIG. 7B, the connectivity pattern $706_1$ for this particular artificial neuron $702_N$ has been modulated in extent to generate a new connectivity pattern $706_2$, which is larger than the connectivity pattern $706_1$ of FIG. 7A. For other aspects, the shape or function of the connectivity pattern may be adjusted, instead of or in addition to the size of the connectivity pattern. After determination of another event, the particular artificial neuron $702_N$ is determined to have synapses with all the artificial neurons 702 having a location on the grid 700 within the updated circular connectivity pattern $706_2$, as illustrated in FIG. 7B. Because the updated connectivity pattern $706_2$ is larger than the previous pattern, more artificial neurons 702 are encompassed by this connectivity pattern, and the particular artificial neuron $702_N$ forms more synapses 704 than with the smaller connectivity pattern $706_1$.

In the example of FIGS. 7A and 7B with circular connectivity, one example parameter that may be stored is the radius of the connectivity pattern. The efficiency of such a scheme (e.g., storing only the radius for the connectivity pattern) according to aspects of the present disclosure becomes apparent with larger radii, where conventional schemes involve storing the indices of all the post-synaptic artificial neurons determined to have synapses with a particular pre-synaptic artificial neuron. According to aspects of the present disclosure, storing all these indices may be avoided, and the synapses for a given pre-synaptic artificial neuron may be determined based on the stored radius and assuming, knowing, being informed in any suitable manner that the connectivity pattern is a circular pattern. Also, if the modulation described above with respect to FIG. 6B is applied, the pre-synaptic artificial neuron may change its connectivity dynamically simply by changing the radius under control of an external factor.

Figure 8:
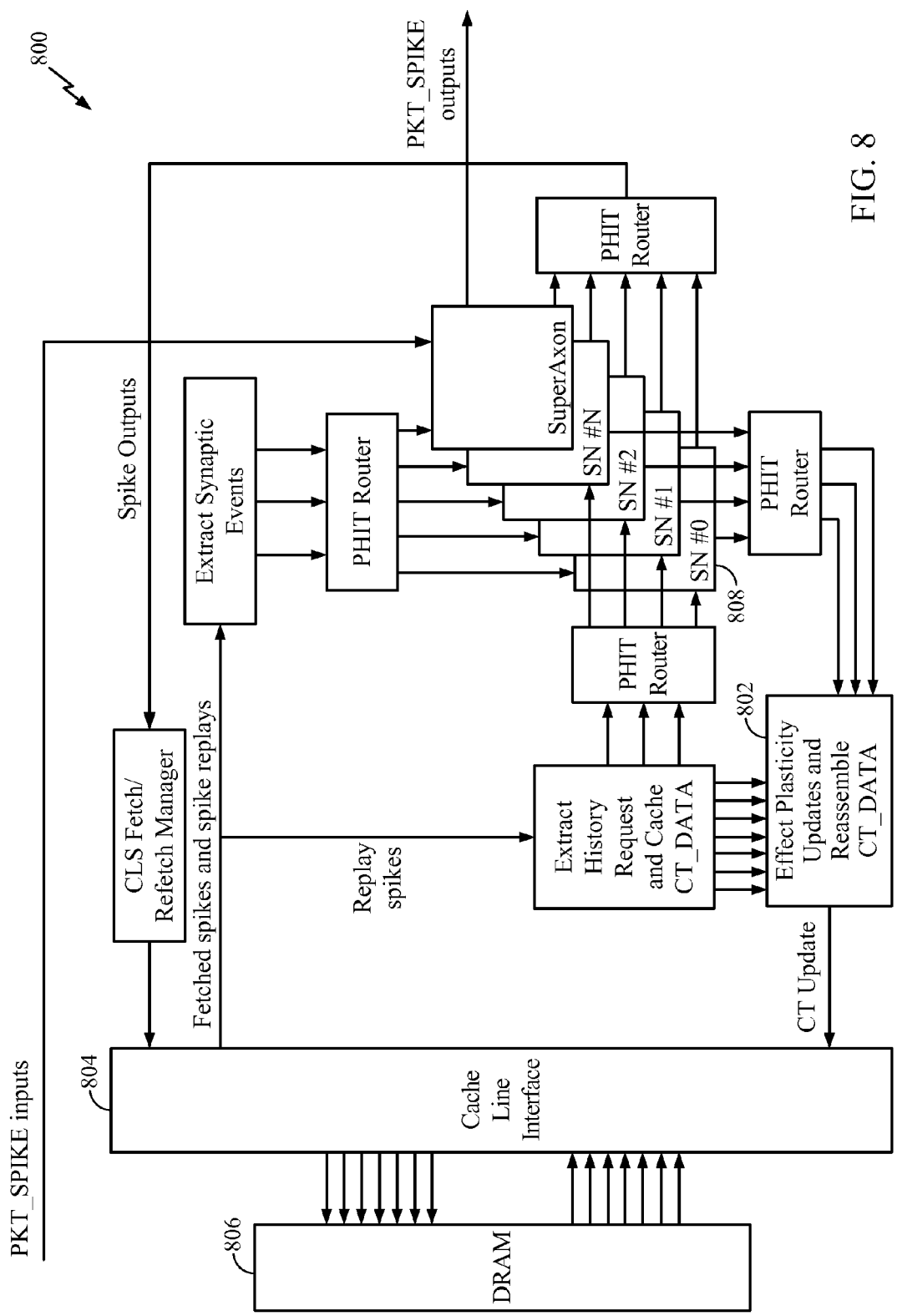
FIG. 8 illustrates a block diagram of an example hardware implementation for an artificial nervous system, in accordance with certain aspects of the present disclosure.

FIG. 8 is a block diagram 800 of an example hardware implementation for an artificial nervous system, in accordance with certain aspects of the present disclosure. STDP updating, as described above, may occur in an Effect Plasticity Updates and Reassemble block 802. For certain aspects, the updated synaptic weights may be stored (via a cache line interface 804) in off-chip memory (e.g., dynamic random access memory (DRAM) 806).

In a typical artificial nervous system, there are many more synapses than artificial neurons, and for a large neural network, processing the synapse updates in an efficient manner is desired. The large number of synapses may suggest storing the synaptic weight and other parameters in memory (e.g., DRAM 806). For certain aspects, the connectivity pattern parameters may also be stored in memory (e.g., DRAM 806), as described above. When artificial neurons generate spikes in a so-called "super neuron (SN)" 808, the neurons may forward those spikes to the post-synaptic neurons based on connectivity patterns or through DRAM lookups to determine the post-synaptic neurons and corresponding neural weights.

Figure 9:
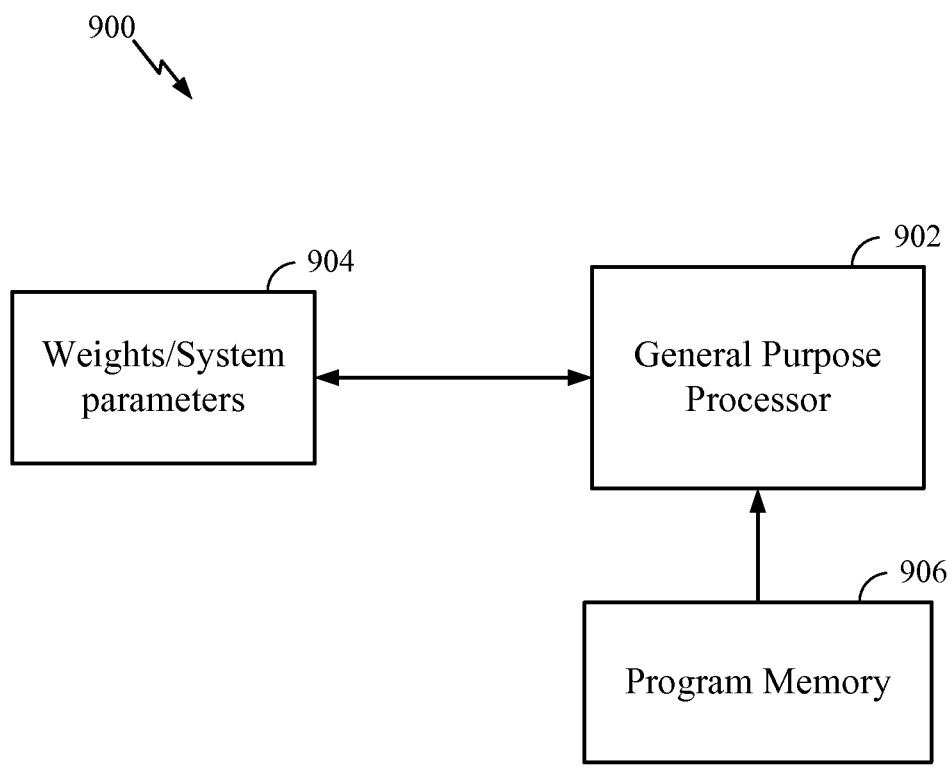
FIG. 9 illustrates an example implementation for neuromorphic processing using a general-purpose processor, in accordance with certain aspects of the present disclosure.

FIG. 9 illustrates an example block diagram 900 of components for neuromorphic processing using a general-purpose processor 902 in accordance with certain aspects of the present disclosure. Variables (neural signals), synaptic weights, and/or system parameters associated with a computational network (neural network) may be stored in a memory block 904, while instructions related executed at the general-purpose processor 902 may be loaded from a program memory 906. In an aspect of the present disclosure, the instructions loaded into the general-purpose processor 902 may comprise code for determining, for an artificial neuron, an event has occurred; code for determining, based on the event, one or more synapses with other artificial neurons based on a connectivity pattern associated with the artificial neuron; and code for applying a spike from the artificial neuron to the other artificial neurons based on the determined synapses.

Figure 10:
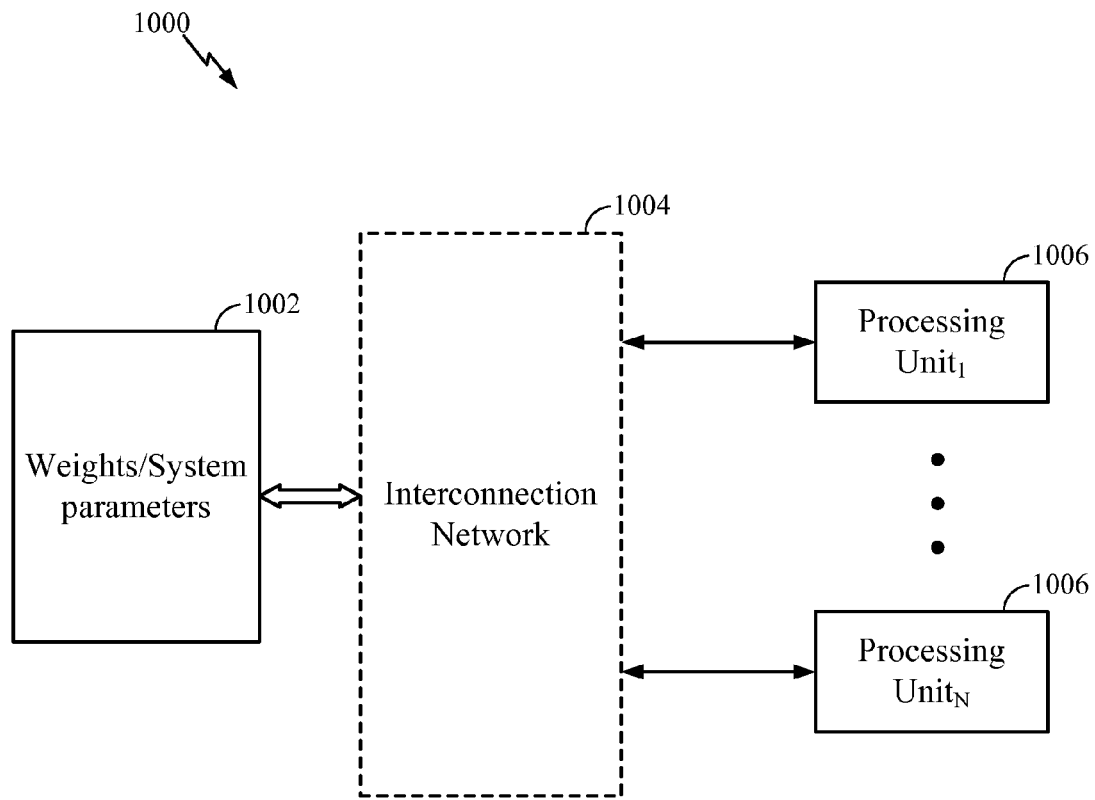
FIG. 10 illustrates an example implementation for neuromorphic processing where a memory may be interfaced with individual distributed processing units, in accordance with certain aspects of the present disclosure.

FIG. 10 illustrates an example block diagram 1000 of components for neuromorphic processing where a memory 1002 can be interfaced via an interconnection network 1004 with individual (distributed) processing units (neural processors) 1006 of a computational network (neural network) in accordance with certain aspects of the present disclosure. Variables (neural signals), synaptic weights, and/or system parameters associated with the computational network (neural network) may be stored in the memory 1002, and may be loaded from the memory 1002 via connection(s) of the interconnection network 1004 into each processing unit (neural processor) 1006. In an aspect of the present disclosure, the processing unit 1006 may be configured to determine, for an artificial neuron, an event has occurred; to determine, based on the event, one or more synapses with other artificial neurons based on a connectivity pattern associated with the artificial neuron; and to apply a spike from the artificial neuron to the other artificial neurons based on the determined synapses.

Figure 11:
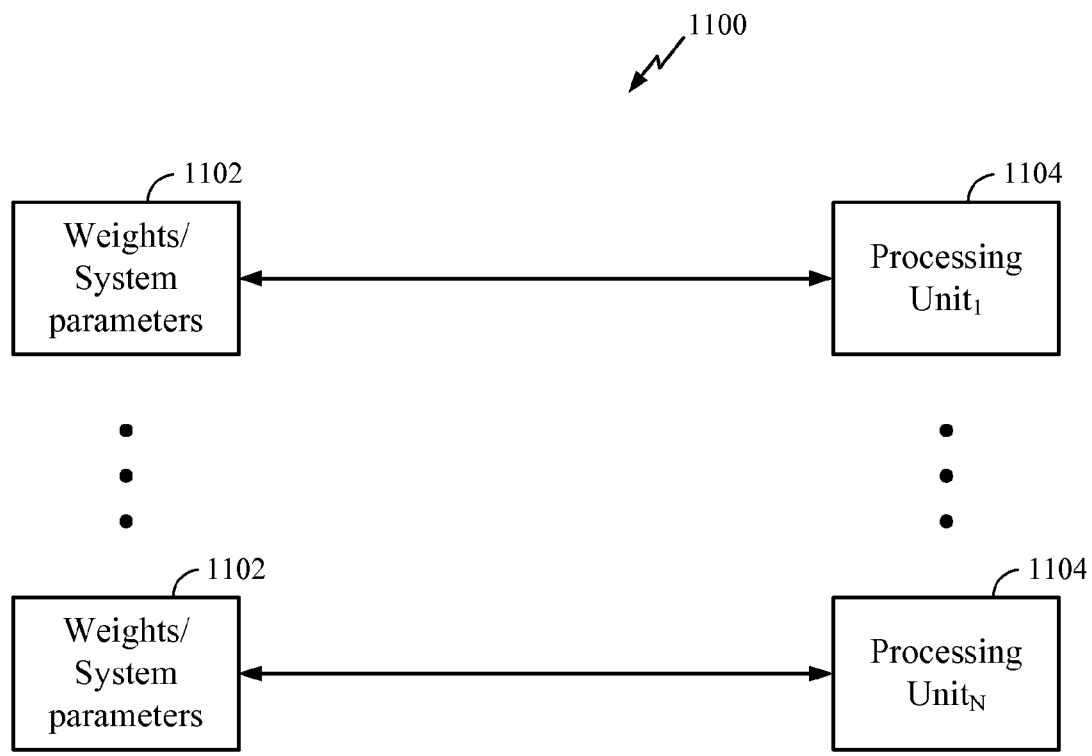
FIG. 11 illustrates an example implementation for neuromorphic processing based on distributed memories and distributed processing units, in accordance with certain aspects of the present disclosure.

FIG. 11 illustrates an example block diagram 1100 of components for neuromorphic processing based on distributed weight memories 1102 and distributed processing units (neural processors) 1104 in accordance with certain aspects of the present disclosure. As illustrated in FIG. 11, one memory bank 1102 may be directly interfaced with one processing unit 1104 of a computational network (neural network), wherein that memory bank 1102 may store variables (neural signals), synaptic weights, and/or system parameters associated with that processing unit (neural processor) 1104. In an aspect of the present disclosure, the processing unit(s) 1104 may be configured to determine, for an artificial neuron, an event has occurred; to determine, based on the event, one or more synapses with other artificial neurons based on a connectivity pattern associated with the artificial neuron; and to apply a spike from the artificial neuron to the other artificial neurons based on the determined synapses.

Figure 12:
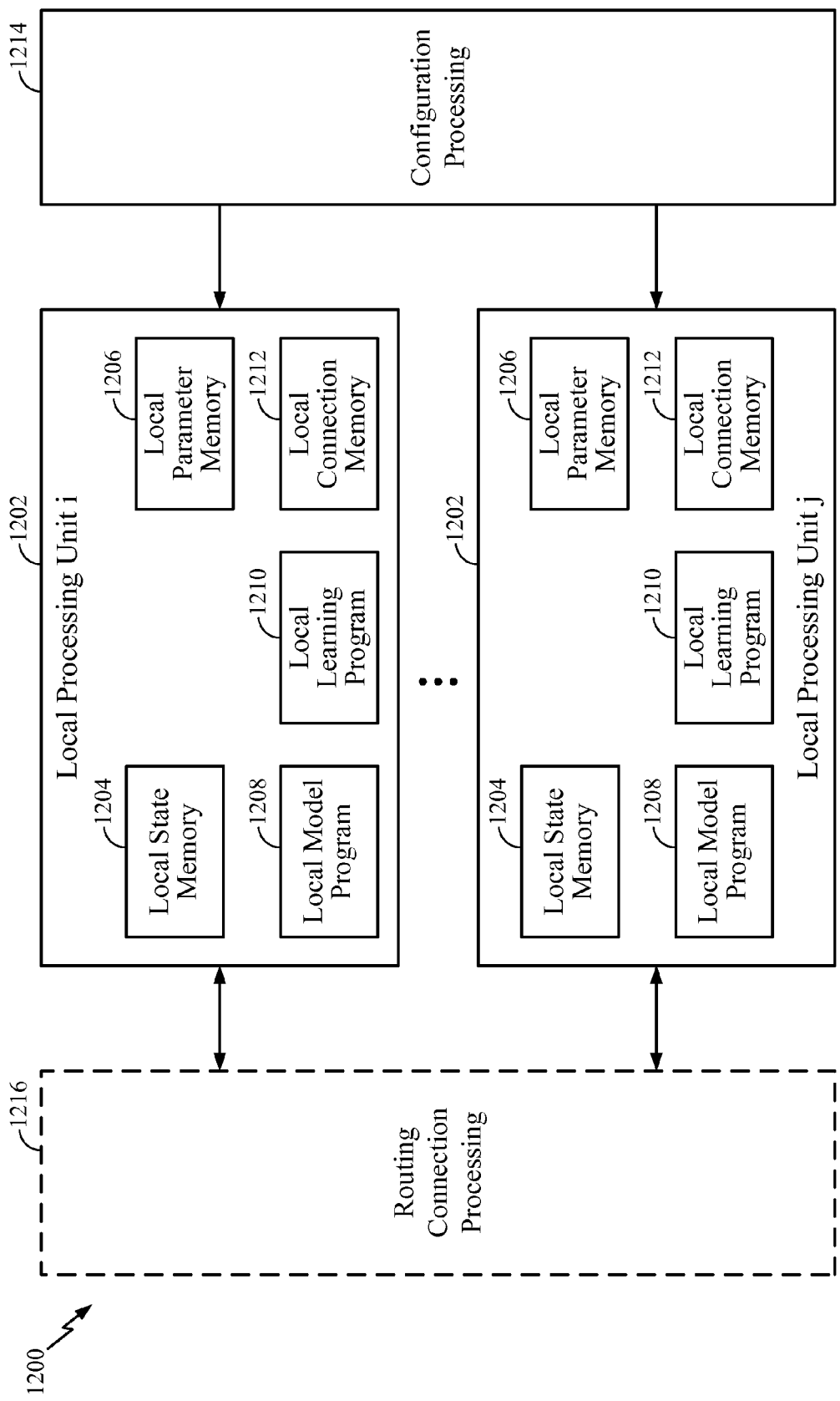
FIG. 12 illustrates an example implementation of a neural network in accordance with certain aspects of the present disclosure.

FIG. 12 illustrates an example implementation of a neural network 1200 in accordance with certain aspects of the present disclosure. As illustrated in FIG. 12, the neural network 1200 may comprise a plurality of local processing units 1202 that may perform various operations of methods described above. Each processing unit 1202 may comprise a local state memory 1204 and a local parameter memory 1206 that store parameters of the neural network. In addition, the processing unit 1202 may comprise a memory 1208 with a local (neuron) model program, a memory 1210 with a local learning program, and a local connection memory 1212. Furthermore, as illustrated in FIG. 12, each local processing unit 1202 may be interfaced with a unit 1214 for configuration processing that may provide configuration for local memories of the local processing unit, and with routing connection processing elements 1216 that provide routing between the local processing units 1202.

According to certain aspects of the present disclosure, each local processing unit 1202 may be configured to determine parameters of the neural network based upon desired one or more functional features of the neural network, and develop the one or more functional features towards the desired functional features as the determined parameters are further adapted, tuned, and updated.

Figure 5A:
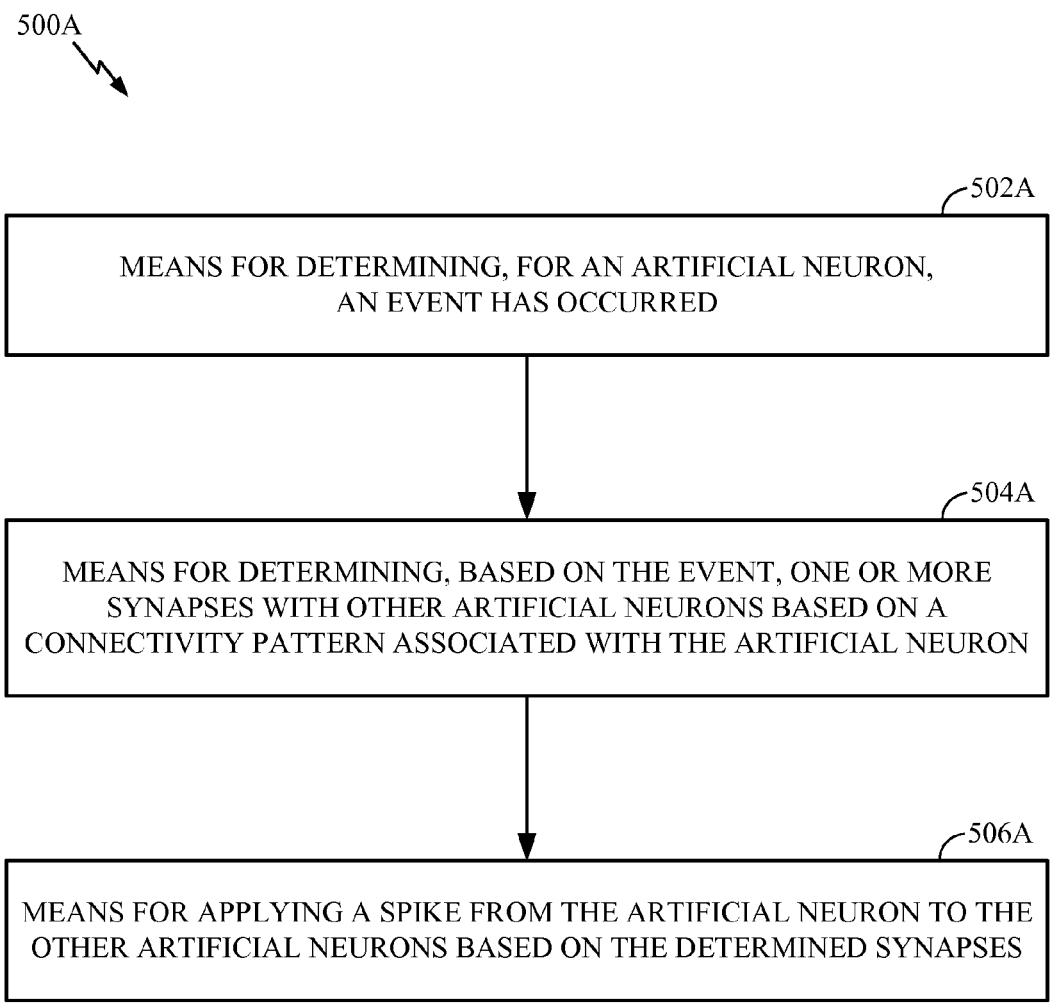
FIG. 5A illustrates example means capable of performing the operations shown in FIG. 5.

The various operations of methods described above may be performed by any suitable means capable of performing the corresponding functions. The means may include various hardware and/or software component(s) and/or module(s), including, but not limited to a circuit, an application specific integrated circuit (ASIC), or processor. For example, the various operations may be performed by one or more of the various processors shown in FIGS. 9-12. Generally, where there are operations illustrated in figures, those operations may have corresponding counterpart means-plus-function components with similar numbering. For example, operations 500 illustrated in FIG. 5 correspond to means 500A illustrated in FIG. 5A.

For example, means for displaying may comprise a display (e.g., a monitor, flat screen, touch screen, and the like), a printer, or any other suitable means for outputting data for visual depiction (e.g., a table, chart, or graph). Means for processing, means for applying, means for using, or means for determining may comprise a processing system, which may include one or more processors or processing units. Means for storing may comprise a memory or any other suitable storage device (e.g., RAM), which may be accessed by the processing system.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

As used herein, a phrase referring to "at least one of" a list of items refers to any combination of those items, including single members. As an example, "at least one of a, b, or c" is intended to cover a, b, c, a-b, a-c, b-c, and a-b-c.

The various illustrative logical blocks, modules, and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, EPROM memory, EEPROM memory, registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may be implemented with an ASIC (Application Specific Integrated Circuit) with the processor, the bus interface, the user interface, supporting circuitry, and at least a portion of the machine-readable media integrated into a single chip, or with one or more FPGAs (Field Programmable Gate Arrays), PLDs (Programmable Logic Devices), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a device as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a device can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for neuromorphic processing, comprising:
determining an event has occurred for an artificial neuron;
using an interpolation technique to determine one or more synapses between the artificial neuron and other artificial neurons based at least in part on the event and a connectivity pattern associated with the artificial neuron; and
applying a spike from the artificial neuron to the other artificial neurons based at least in part on the determined one or more synapses.

2. The method of claim 1, further comprising applying at least one dynamic variable to the spike from the artificial neuron for each of the one or more synapses.

3. The method of claim 2, wherein the at least one dynamic variable comprises at least one of a delay or a weight.

4. The method of claim 2, wherein the at least one dynamic variable is stored in a random access memory (RAM) and accessed from the RAM before application.

5. The method of claim 1, wherein at least one of the connectivity pattern or parameters for defining the connectivity pattern are stored in memory.

6. The method of claim 1, further comprising applying a modulation factor to the connectivity pattern.

7. The method of claim 6, wherein the modulation factor represents an aging factor associated with the artificial neuron.

8. The method of claim 6, wherein the modulation factor is exponentially decaying.

9. The method of claim 6, wherein applying the modulation factor changes at least one of a shape or an extent of the connectivity pattern.

10. The method of claim 1, wherein the interpolation comprises spline interpolation.

11. The method of claim 1, further comprising applying jitter to the connectivity pattern.

12. The method of claim 1, further comprising using feedback to regulate a number of the one or more synapses associated with the artificial neuron.

13. The method of claim 1, wherein the event comprises at least one of activation of the artificial neuron or a prediction of activating the artificial neuron.

14. An apparatus for neuromorphic processing, comprising:
a processing system configured to:
determine an event has occurred for an artificial neuron;
using an interpolation technique to determine one or more synapses between the artificial neuron and other artificial neurons based at least in part on the event and a connectivity pattern associated with the artificial neuron; and
apply a spike from the artificial neuron to the other artificial neurons based at least in part on the determined one or more synapses; and
a memory coupled to the processing system.

15. The apparatus of claim 14, wherein the processing system is further configured to apply at least one dynamic variable to the spike from the artificial neuron for each of the one or more synapses.

16. The apparatus of claim 15, wherein the at least one dynamic variable comprises at least one of a delay or a weight.

17. The apparatus of claim 15, wherein the memory comprises a random access memory (RAM) and wherein the at least one dynamic variable is stored in and accessed from the RAM before application.

18. The apparatus of claim 14, wherein at least one of the connectivity pattern or parameters for defining the connectivity pattern are stored in the memory.

19. The apparatus of claim 14, wherein the processing system is further configured to apply a modulation factor to the connectivity pattern.

20. The apparatus of claim 19, wherein the modulation factor represents an aging factor associated with the artificial neuron.

21. The apparatus of claim 19, wherein the modulation factor is exponentially decaying.

22. The apparatus of claim 19, wherein applying the modulation factor changes at least one of a shape or an extent of the connectivity pattern.

23. The apparatus of claim 14, wherein the interpolation comprises spline interpolation.

24. The apparatus of claim 14, wherein the processing system is further configured to apply jitter to the connectivity pattern.

25. The apparatus of claim 14, wherein the processing system is further configured to use feedback to regulate a number of the one or more synapses associated with the artificial neuron.

26. The apparatus of claim 14, wherein the event comprises at least one of activation of the artificial neuron or a prediction of activating the artificial neuron.

27. An apparatus for neuromorphic processing, comprising:
means for determining an event has occurred for an artificial neuron;
means for using an interpolation technique to determine one or more synapses between the artificial neuron and other artificial neurons based at least in part on the event and a connectivity pattern associated with the artificial neuron; and
means for applying a spike from the artificial neuron to the other artificial neurons based at least in part on the determined one or more synapses.

28. The apparatus of claim 27, further comprising means for applying at least one dynamic variable to the spike from the artificial neuron for each of the one or more synapses.

29. The apparatus of claim 28, wherein the at least one dynamic variable comprises at least one of a delay or a weight.

30. The apparatus of claim 28, wherein the at least one dynamic variable is stored in a random access memory (RAM) and accessed from the RAM before application.

31. The apparatus of claim 27, further comprising means for storing at least one of the connectivity pattern or parameters for defining the connectivity pattern.

32. The apparatus of claim 27, further comprising means for applying a modulation factor to the connectivity pattern.

33. The apparatus of claim 32, wherein the modulation factor represents an aging factor associated with the artificial neuron.

34. The apparatus of claim 32, wherein the modulation factor is exponentially decaying.

35. The apparatus of claim 32, wherein application of the modulation factor changes at least one of a shape or an extent of the connectivity pattern.

36. The apparatus of claim 27, wherein the interpolation comprises spline interpolation.

37. The apparatus of claim 27, further comprising means for applying jitter to the connectivity pattern.

38. The apparatus of claim 27, further comprising means for using feedback to regulate a number of the one or more synapses associated with the artificial neuron.

39. The apparatus of claim 27, wherein the event comprises at least one of activation of the artificial neuron or a prediction of activating the artificial neuron.

40. A non-transitory computer-readable storage medium having instructions executable to:
   determine an event has occurred for an artificial neuron;
   using an interpolation technique to determine one or more synapses between the artificial neuron and other artificial neurons based at least in part on the event and a connectivity pattern associated with the artificial neuron; and
   apply a spike from the artificial neuron to the other artificial neurons based at least in part on the determined one or more synapses.

* * * * *